US012530195B2

(12) United States Patent
Adelman et al.

(10) Patent No.: US 12,530,195 B2
(45) Date of Patent: Jan. 20, 2026

(54) INSTRUCTION SET FOR MIN-MAX OPERATIONS

(71) Applicant: Intel Corporation, Santa Clara, CA (US)

(72) Inventors: Menachem Adelman, Modi'in (IL); Amit Gradstein, Binyamina (IL); Cristina Anderson, Hillsboro, OR (US); Marius Cornea-Hasegan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 733 days.

(21) Appl. No.: 17/747,919

(22) Filed: May 18, 2022

(65) Prior Publication Data

US 2023/0376313 A1 Nov. 23, 2023

(51) Int. Cl.
*G06F 9/30* (2018.01)
*G06F 7/22* (2006.01)
*G06F 7/483* (2006.01)

(52) U.S. Cl.
CPC ............ *G06F 9/30145* (2013.01); *G06F 7/22* (2013.01); *G06F 7/483* (2013.01); *G06F 9/30021* (2013.01)

(58) Field of Classification Search
None
See application file for complete search history.

(56) References Cited

U.S. PATENT DOCUMENTS

| 8,914,430 | B2 | 12/2014 | Gradstein et al. |
| 9,448,765 | B2 | 9/2016 | Anderson et al. |
| 2012/0102196 | A1* | 4/2012 | Wells ............... H04L 63/1441 709/224 |
| 2018/0088945 | A1* | 3/2018 | Plotnikov ............ G06F 9/30021 |
| 2018/0189064 | A1* | 7/2018 | Plotnikov ............ G06F 9/30021 |

(Continued)

FOREIGN PATENT DOCUMENTS

WO WO-2018077671 A1 * 5/2018 ......... G06F 9/30021

OTHER PUBLICATIONS

Bagnara, R. et al., Correct approximation of IEEE 754 floating-point arithmetic for program verification, Feb. 22, 2022, Springer, pp. 29-69. (Year: 2022).*

(Continued)

*Primary Examiner* — Eric Coleman
(74) *Attorney, Agent, or Firm* — Essential Patents Group, LLP

(57) ABSTRACT

Techniques for instructions for min-max operations are described. An example apparatus comprises decoder circuitry to decode a single instruction, the single instruction to include fields for identifiers of a first source operand, a second source operand, an a destination operand, a field for an immediate operand, and a field for an opcode, the opcode to indicate execution circuitry is to perform a min-max operation, and execution circuitry to execute the decoded instruction according to the opcode to perform the min-max operation to determine a particular operation of five or more minimum and maximum operations in accordance with a value of the immediate operand, perform the determined particular operation on the identified first source operand and the identified second source operand to return a result, and store the result into the identified destination operand. Other examples are described and claimed.

18 Claims, 21 Drawing Sheets

(56) References Cited

U.S. PATENT DOCUMENTS

2023/0297377 A1* 9/2023 Bhardwaj ........... G06F 9/30032
                                                        712/220
2023/0298126 A1* 9/2023 Woop ...................... G06T 15/06
                                                        345/557
2023/0350641 A1* 11/2023 Tessari .................... G06F 7/582

OTHER PUBLICATIONS

"IEEE Standard for Floating-Point Arithmetic", IEEE Std 754-2019, Year: 2019, 3 pgs.
"Intel 64 and IA-32 Architectures Software Developer's Manual", Dec. 2021, pp. 5-515-5-529.

* cited by examiner

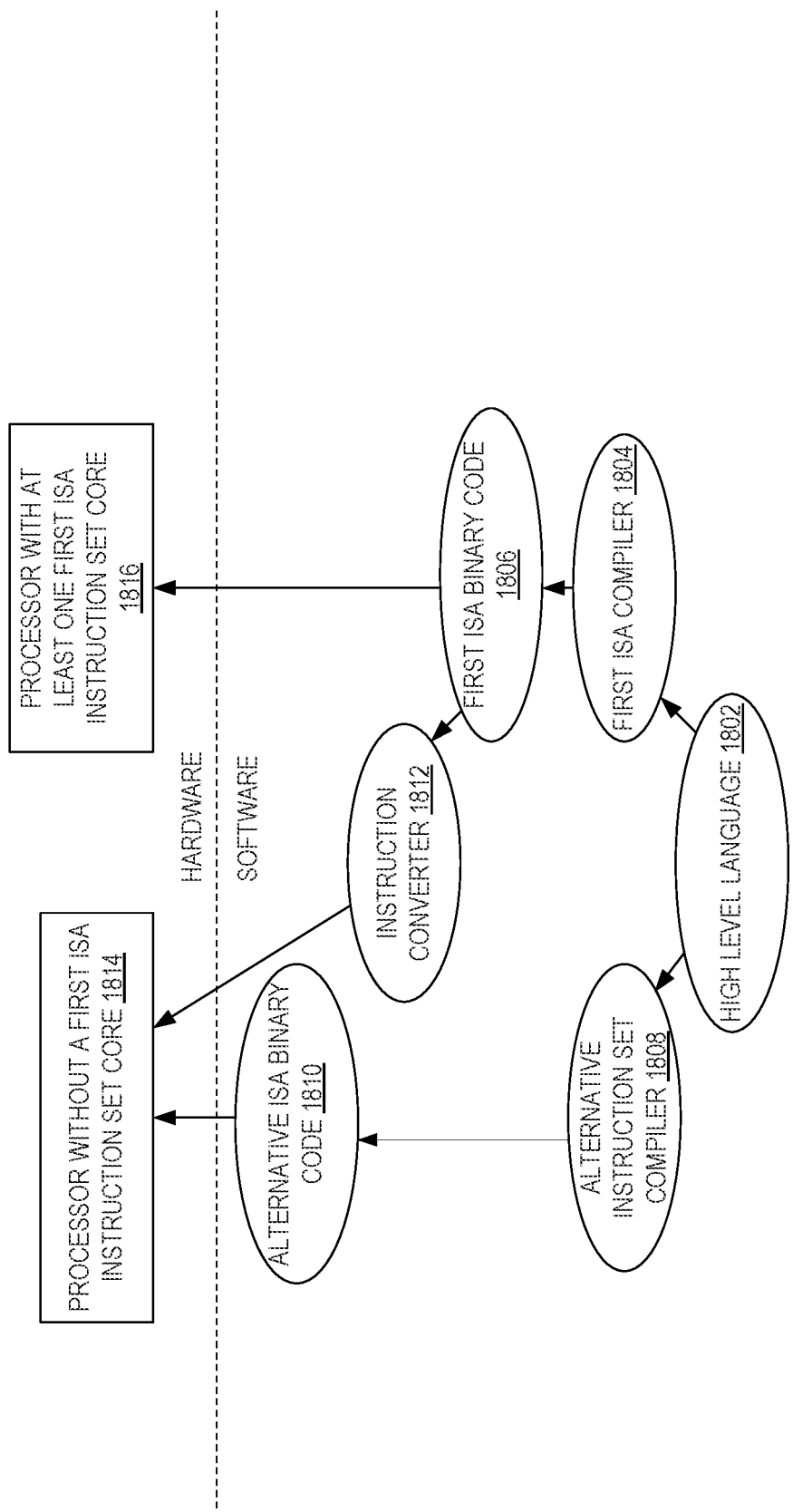

INSTRUCTION SET FOR MIN-MAX OPERATIONS

BACKGROUND

The Institute of Electrical and Electronics Engineers (IEEE) Standard for Floating-Point Arithmetic (IEEE Standard 754-2019, published Jul. 22, 2019, that supersedes IEEE Standard 754-2008, published Aug. 29, 2008) specifies interchange and arithmetic formats and methods for binary and decimal floating-point arithmetic in computer programming environments. The standard further defines exception conditions and specifies handling of the exception conditions. An implementation of a floating-point system conforming to this standard may be realized entirely in software, entirely in hardware, or in any combination of software and hardware. For operations specified in the normative part of this standard, numerical results and exceptions are uniquely determined by the values of the input data, sequence of operations, and destination formats, all under user control.

BRIEF DESCRIPTION OF DRAWINGS

Various examples in accordance with the present disclosure will be described with reference to the drawings, in which:

FIG. 18 is a block diagram illustrating the use of a software instruction converter to convert binary instructions in a source instruction set architecture to binary instructions in a target instruction set architecture according to examples.

DETAILED DESCRIPTION

Figure 1:
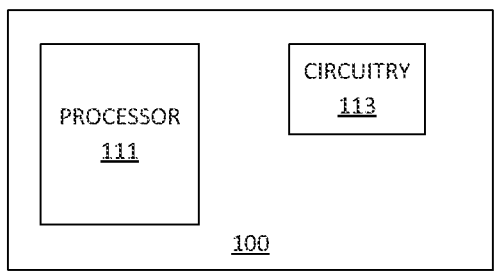
FIG. 1 is a block diagram of an example of an apparatus in one implementation.

The present disclosure relates to methods, apparatus, systems, and non-transitory computer-readable storage media for an instruction set for min-max operations. According to some examples, the technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to provide an instruction set for min-max operations.

In the following description, numerous details are discussed to provide a more thorough explanation of the examples of the present disclosure. It will be apparent to one skilled in the art, however, that examples of the present disclosure may be practiced without these specific details. In other instances, well-known structures and devices are shown in block diagram form, rather than in detail, in order to avoid obscuring examples of the present disclosure.

Note that in the corresponding drawings of the examples, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary examples to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the examples of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Some examples may provide technology for an instruction set for min-max operations. Various processor instructions may perform various min-max operations. For example, an x86 MIN instruction may perform a minimum operation, an x86 MAX instruction may perform a maximum operation, and an x86 VRANGE instruction may perform a range operation where an immediate operand of the VRANGE instruction specifies the initial comparison operation to be one of max, min, max absolute value or min absolute value of the input value pair. A problem is that adherence with the Institute of Electrical and Electronics Engineers (IEEE) Standard for Floating-Point Arithmetic (IEEE Standard 754-2019, published Jul. 22, 2019, that supersedes IEEE Standard 754-2008, published Aug. 29, 2008) may involve emulation through longer instruction sequences with some instructions sets on some processor architectures, which may result in degraded performance. In particular, the IEEE standard 754-2019 defines different handling for symbolic floating-point datums (sometimes also referred to as Not-A-Number (NAN)). A NAN may be a quiet NAN (QNAN) or a signaling NAN (SNAN). Some operations propagate QNANs without signaling exceptions, and signal an invalid operation exception when given a SNAN operand.

WebAssembly (abbreviated Wasm) is a binary instruction format for a stack-based virtual machine. Wasm is designed as a portable compilation target for programming languages, enabling deployment on the web for client and server applications. Some implementations of Wasm with some instruction sets on some processors may also need emulation through longer instruction sequences, that may also result in degraded performance for Wasm code execution.

Some examples may overcome one or more of the foregoing problems. Some examples may provide technology for instructions for IEEE-754-2019 and Wasm minimum and maximum operations. In particular, some examples may provide instruction set architecture (ISA) support for min-max operations according to the IEEE 754-2019 standard, and also may match Wasm specifications. Advantageously, some examples of min-max instructions may support one or more floating point standards, may not require emulation, and may allow native execution of min-max operations in Wasm on an underlying processor architecture.

With reference to FIG. 1, an example of an apparatus 100 may include a processor 111 to perform arithmetic operations that include at least at least minimum operations, maximum operations, and magnitude operations, and circuitry 113 coupled to the processor 111 to, in response to a single processor instruction, cause the processor 111 to perform a particular operation of five or more min-max operations on two or more source inputs to produce one or more results. For example, each of the source inputs may include one or more input arguments for a subsequent min-max operation, and the single processor instruction may indicate various groupings of the arguments, min-max operations between various arguments and/or between the various groupings of the arguments, various orders of the min-max operations, etc. For example, the various inputs and indications may be included in the instruction itself (e.g., through the opcode, explicit fields of the instruction, pre-determined or implicit inputs/indications, etc.), or the instruction may explicitly or implicitly point to the information that identifies the various inputs and indications. Similarly, destination locations for the one or more results may be explicit operands of the single processor instruction or may be implicit locations (e.g., pre-determined registers or memory locations). For example, in response to the single processor instruction, the circuitry 113 may be further configured to cause the processor 111 to store the one or more results of the particular operation in a location indicated by the single processor instruction.

In some implementations, the single processor instruction may include an immediate operand that indicates the particular operation of the five or more min-max operations. For example, the immediate operand may indicate the particular operation as one of a minimum operation, a minimum number operation, a minimum magnitude operation, a minimum magnitude number operation, a maximum operation, a maximum number operation, a maximum magnitude operation, and a maximum magnitude number operation.

In one example, in response to the single processor instruction, the circuitry 113 may be further configured to cause the processor 111 to determine that the particular operation is one of a minimum operation and a maximum operation, and perform the particular operation to return a QNAN as a result if either of the two or more source inputs for the particular operation is a NAN. In another example, in response to the single processor instruction, the circuitry 113 may be further configured to cause the processor 111 to determine that the particular operation is one of a minimum number operation and a maximum number operation, and perform the particular operation to return a first source input of the two or more source inputs as the result if the first source input for the particular operation is a number and a second source input of the two or more source inputs for the particular operation is a NAN (e.g., even if the second source input is a SNAN), and return a second source input of the two or more source inputs as the result if the second source input for the particular operation is a number and a first source input of the two or more source inputs for the particular operation is a NAN (e.g., even if the first source input is a SNAN). In another example, in response to the single processor instruction, the circuitry 113 may be further configured to cause the processor 111 to determine that the particular operation is one of a minimum magnitude operation and a maximum magnitude operation, and perform the particular operation to return a QNAN as the result if either of the two or more source inputs for the particular operation is a NAN.

For example, the processor 111 may be implemented as any of the processors described herein. In particular, the circuitry 113 may be incorporated in the processor 700, the processor 770, the processor 715, the coprocessor 738, and/or the processor/coprocessor 780 (FIG. 7), the processor 800 (FIG. 8), the core 990 (FIG. 9B), the execution units 962 (FIGS. 9B and 10), and the processor 1816 (FIG. 18).

Figure 2:
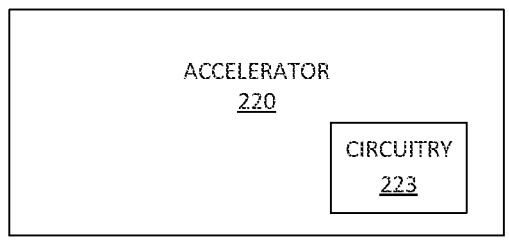
FIG. 2 is a block diagram of an example of an accelerator in one implementation.

With reference to FIG. 2, an example of an accelerator 220 may include hardware circuitry 223 to perform arithmetic operations that include at least a particular min-max operation of five or more min-max operations on two or more source inputs to produce one or more results, in response to a single accelerator instruction. For example, each of the source inputs may include one or more input arguments for a subsequent min-max operation, and the single accelerator instruction may indicate various groupings of the arguments, min-max operations between various arguments and/or between the various groupings of the arguments, various orders of the min-max operations, etc. For example, the various inputs and indications may be included in the instruction itself (e.g., through the opcode, explicit fields of the instruction, pre-determined or implicit inputs/indications, etc.), or the instruction may explicitly or implicitly point to the information that identifies the various inputs and indications. Similarly, destination locations for the one or more results may be explicit operands of the single accelerator instruction or may be implicit locations (e.g., pre-determined registers or memory locations). For example, in response to a single accelerator instruction, the hardware circuitry 223 may be further configured to cause the accelerator 220 to store the one or more results of the particular operation in a location indicated by the single accelerator instruction. The hardware circuitry 223 have a wide processing width, have a highly parallel architecture, and/or may otherwise be specially configured to accelerate the min-max operations.

In some implementations, the single accelerator instruction may include an immediate operand that indicates the particular operation of the five or more min-max operations. For example, the immediate operand may indicate the particular operation as one of a minimum operation, a minimum number operation, a minimum magnitude operation, a minimum magnitude number operation, a maximum operation, a maximum number operation, a maximum magnitude operation, and a maximum magnitude number operation.

In one example, in response to the single accelerator instruction, the hardware circuitry 223 may be further configured to cause the accelerator 220 to determine that the particular operation is one of a minimum operation and a maximum operation, and perform the particular operation to return a QNAN as a result if either of the two or more source inputs for the particular operation is a NAN. In another example, in response to the single accelerator instruction, the hardware circuitry 223 may be further configured to cause the accelerator 220 to determine that the particular operation is one of a minimum number operation and a maximum number operation, and perform the particular operation to return a first source input of the two or more source inputs as the result if the first source input for the particular operation is a number and a second source input of the two or more source inputs for the particular operation is a NAN (e.g., even if the second source input is a SNAN), and return a second source input of the two or more source inputs as the result if the second source input for the particular operation is a number and a first source input of the two or more source inputs for the particular operation is a NAN (e.g., even if the first source input is a SNAN). In another example, in response to the single accelerator instruction, the hardware circuitry 223 may be further configured to cause the accelerator 220 to determine that the particular operation is one of a minimum magnitude operation and a maximum magnitude operation, and perform the particular operation to return a QNAN as the result if either of the two or more source inputs for the particular operation is a NAN.

Figure 3:
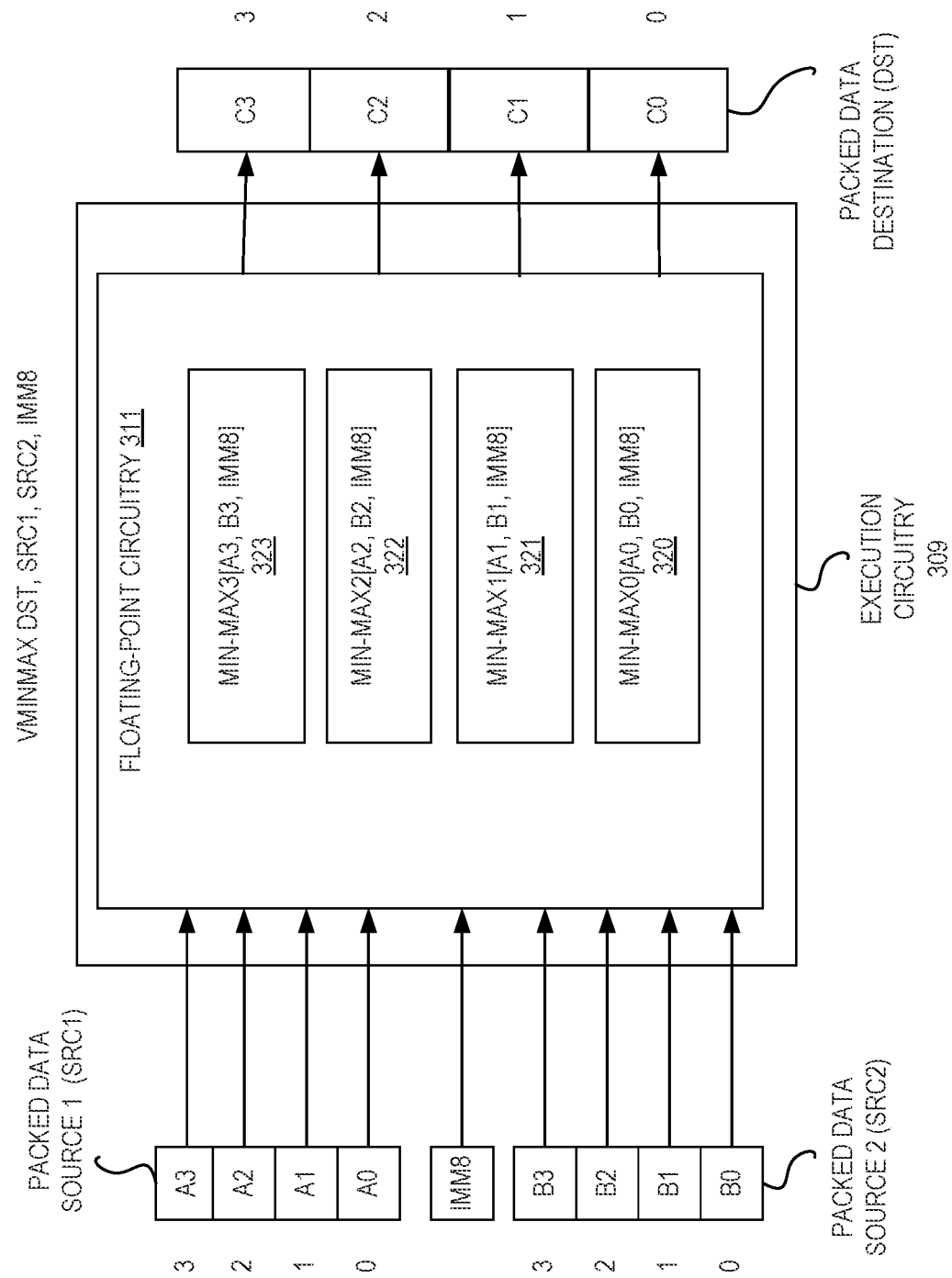
FIG. 3 is an illustrative diagram of an exemplary execution of a min-max operation instruction in one implementation.

FIG. 3 illustrates an exemplary execution of a vector min-max operation instruction (VMINMAX). An example nominal format for the instruction may be <VMINMAX DST, SRC1, SRC2, IMM8>, where IMM8 is an 8-bit immediate operand that indicates which min-max operation to perform. In the illustrated example, SRC1, SRC2, and DST may all be packed data. The packed data sources are passed to execution circuitry 309 that includes floating-point circuitry 311 that is configured to perform the min-max operation according to the instruction. For vector operation, the floating-point circuitry 311 may include parallel min-max circuitry min-max0 320, min-max1 321, min-max2 322, and min-max1 323 configured to perform the min-max operation indicated by IMM8 on respective paired operands of SRC1 (e.g., A0 through A3) and SRC2 (e.g., B0 through B3). For example, each of the min-max circuits may include selection circuitry (e.g., a de-multiplexor or other selector circuit) that takes three or more bits of IMM8 to select the comparison to be performed and comparison circuitry to perform the selected comparison. The results of the respective min-max operations (e.g., C0 through C3) is stored in the packed data destination DST. While this illustration is in little endian format, the principles discussed herein work in big endian format.

Figure 4:
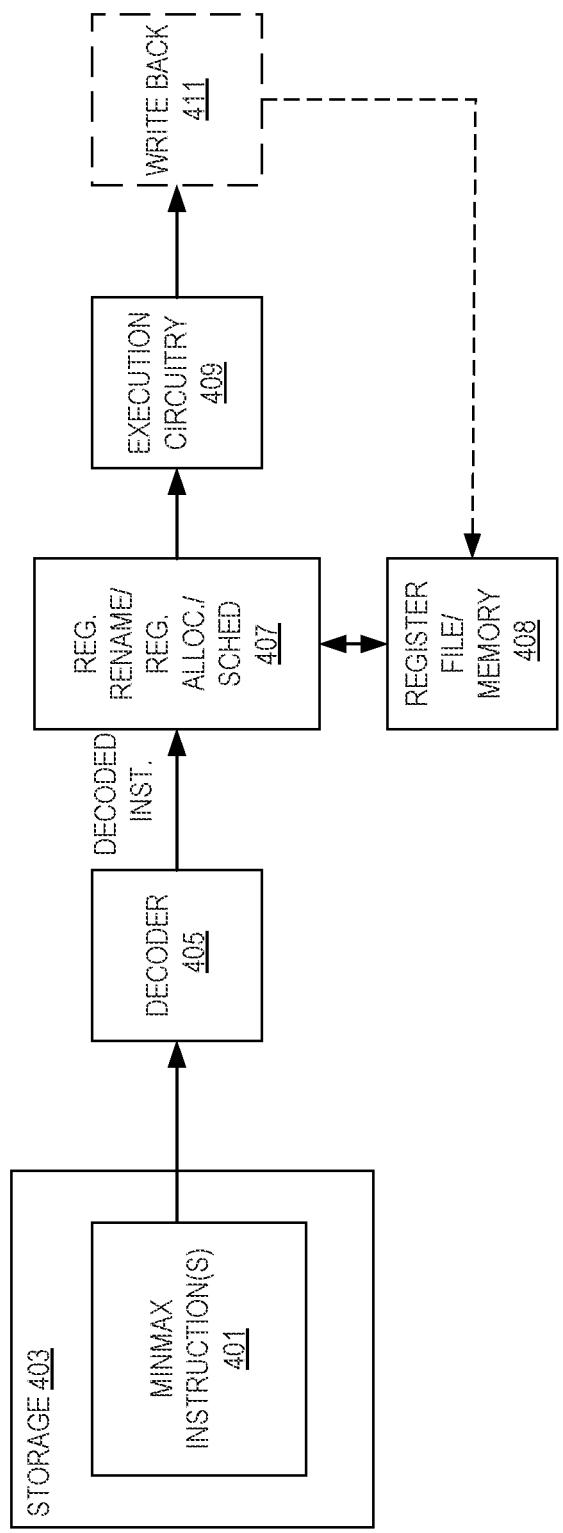
FIG. 4 is a block diagram of an example of hardware to process an instruction in one implementation.

FIG. 4 illustrates examples of hardware to process an instruction. The instruction may be a min-max operation instruction, such as MINMAX instruction. As illustrated, storage 403 stores a MINMAX instruction 401 to be executed.

The instruction 401 is received by decoder circuitry 405. For example, the decoder circuitry 405 receives this instruction from fetch circuitry (not shown). The instruction may be in any suitable format, such as that describe with reference to FIG. 12 below. In an example, the instruction includes fields for an opcode, two or more source identifiers (e.g., source operands, operation selection operands, etc.), and a destination identifier. In some examples, the sources and destination are registers, and in other examples one or more are memory locations. In some examples, one or more of the sources may be an immediate operand. In some examples, the opcode details a min-max operation to be performed.

More detailed examples of at least one instruction format for the instruction will be detailed later. The decoder circuitry 405 decodes the instruction into one or more operations. In some examples, this decoding includes generating a plurality of micro-operations to be performed by execution circuitry (such as execution circuitry 409). The decoder circuitry 405 also decodes instruction prefixes.

In some examples, register renaming, register allocation, and/or scheduling circuitry 407 provides functionality for one or more of: 1) renaming logical operand values to physical operand values (e.g., a register alias table in some examples), 2) allocating status bits and flags to the decoded instruction, and 3) scheduling the decoded instruction for execution by execution circuitry out of an instruction pool (e.g., using a reservation station in some examples).

Registers (register file) and/or memory 408 store data as operands of the instruction to be operated on by execution circuitry 409. Exemplary register types include packed data registers, general purpose registers (GPRs), and floating-point registers.

Execution circuitry 409 executes the decoded instruction. Exemplary detailed execution circuitry includes execution circuitry 309 shown in FIG. 3, and execution cluster(s) 960 shown in FIG. 9B, etc. The execution of the decoded instruction causes the execution circuitry 409 to perform the min-max operation to determine a particular operation of five or more minimum and maximum operations in accordance with a value of the immediate operand, perform the determined particular operation on an identified first source operand and an identified second source operand to return a result, and store the result into an identified destination operand.

In some examples, a field for an identifier of the first source operand may be to identify a vector register. Alternatively, the field for the identifier of the first source operand may be to identify a memory location. In some examples, the value of an immediate operand may indicate one of a minimum operation and a maximum operation, and the execution circuitry 409 may be further to execute the decoded instruction according to the opcode to return a symbolic floating-point datum as the result if any of the identified first source operand and the identified second source operand is a symbolic floating-point datum. For example, the execution circuitry 409 may be further to execute the decoded instruction according to the opcode to return a QNAN as the result if either of the identified first and second source operands is a NAN.

In some examples, the value of the immediate operand may indicate one of a minimum number operation and a maximum number operation, and the execution circuitry 409 may be further to execute the decoded instruction according to the opcode to return the identified first source operand as the result if the identified first source operand is a number and the identified second source operand is any type of symbolic floating-point datum, and to return the identified second source operand as the result if the identified second source operand is a number and the identified first source operand is any type of symbolic floating-point datum. For example, the execution circuitry 409 may be further to execute the decoded instruction according to the opcode to return the identified first source operand as the result if the identified first source operand is a number and the identified second source operand is a NAN (e.g., even if the second source input is a SNAN), and return the identified second source operand as the result if the identified second source operand is a number and the identified first source operand is a NAN (e.g., even if the first source input is a SNAN).

In some examples, retirement/write back circuitry 411 architecturally commits the destination register into the registers or memory 408 and retires the instruction.

An example of a format for an MINMAX instruction is OPCODE DST, SRC1, SRC2. In some examples, OPCODE is the opcode mnemonic of the instruction. DST is a field for the destination operand, such as packed data register or memory. SRC1 and SRC2 are fields for the source operands, such as packed data registers and/or memory.

Figure 5A:
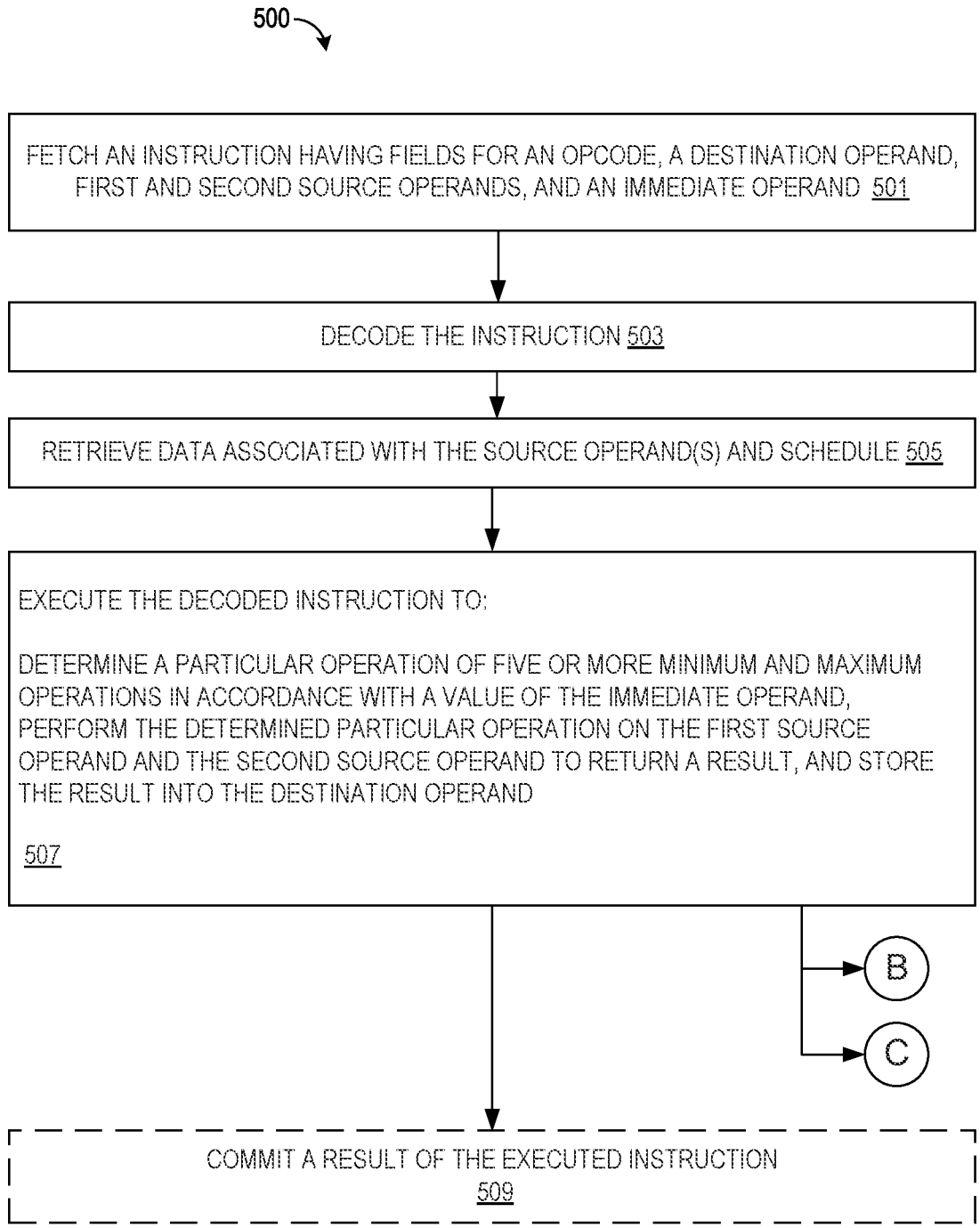
FIGS. 5A-C are illustrative diagrams of an example of a method to process an instruction in one implementation.
Figure 5B:
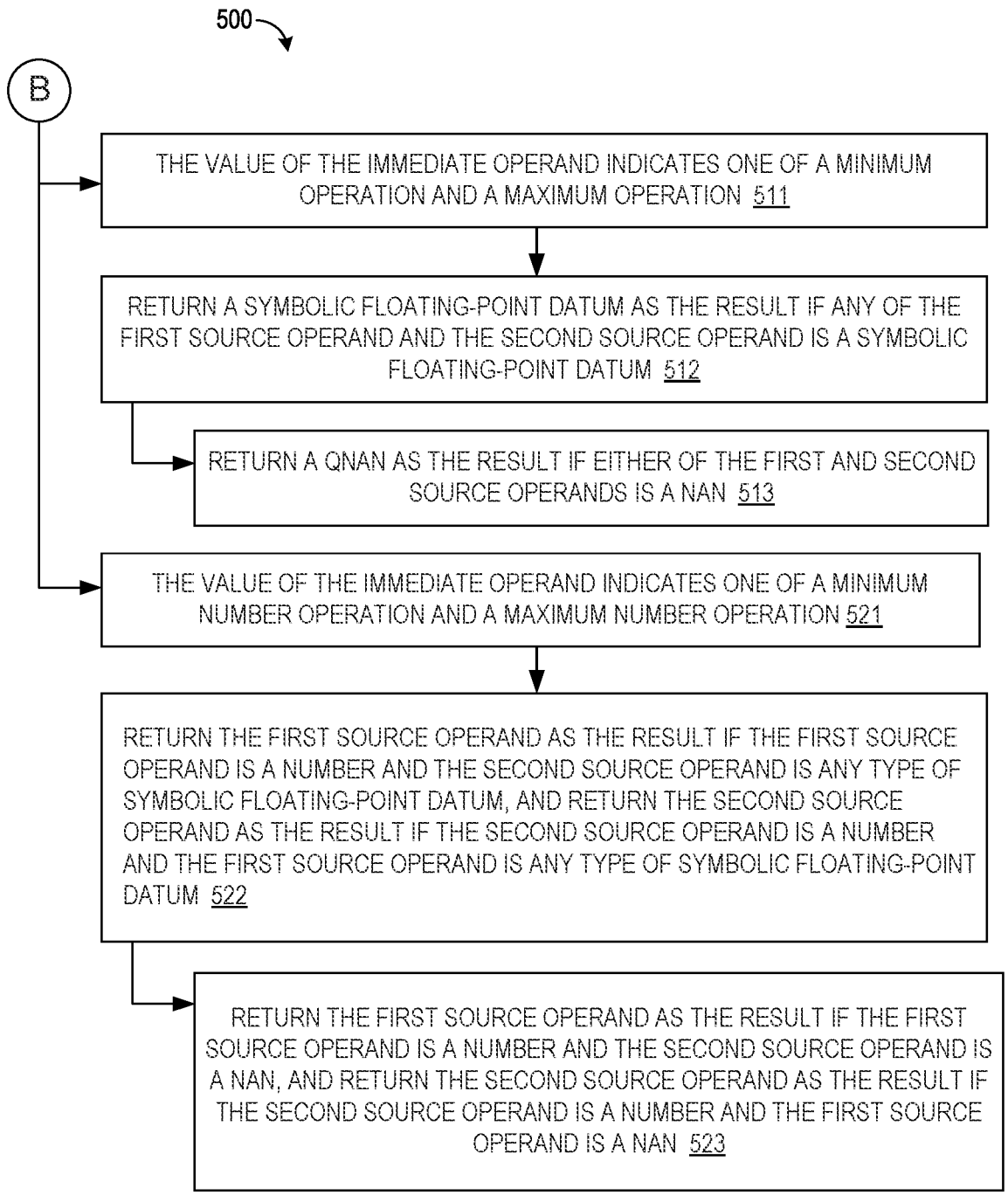
Figure 5C:
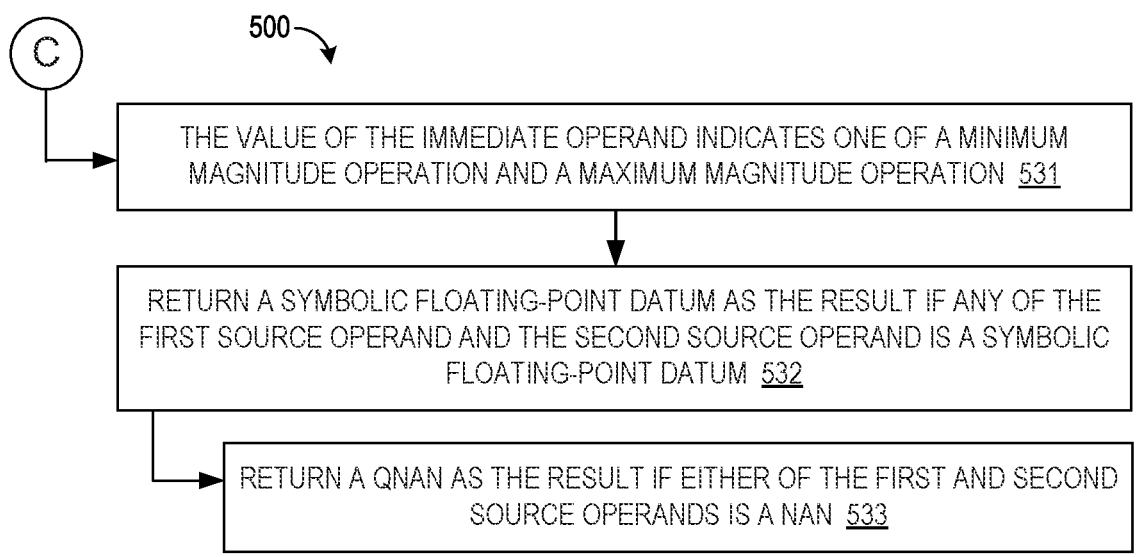

FIGS. 5A to 5C illustrate an example of method 500 performed by a processor to process a MINMAX instruction. For example, a processor core as shown in FIG. 9B, a pipeline as detailed below, etc., performs this method.

Figure 13:
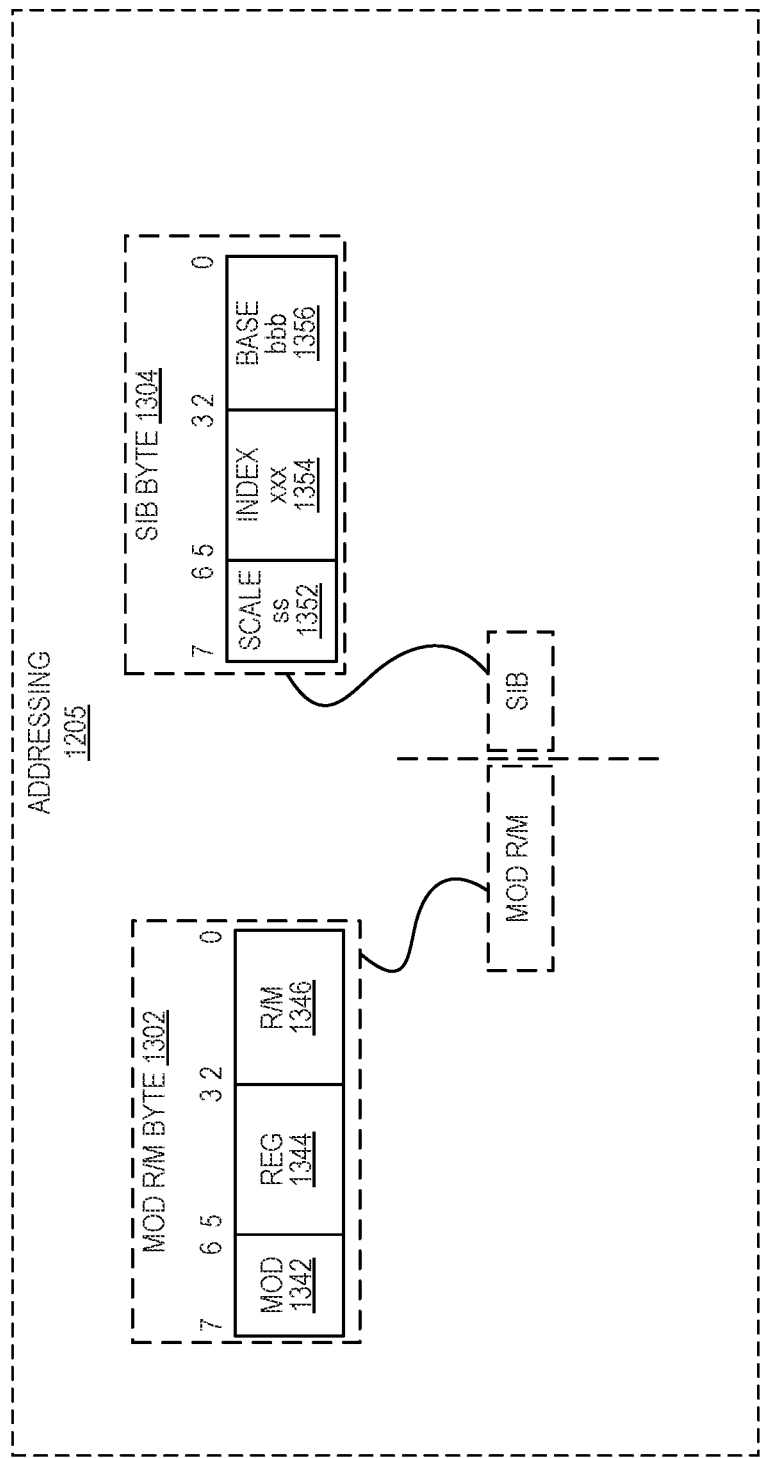
FIG. 13 illustrates examples of an addressing field.
Figure 16A:
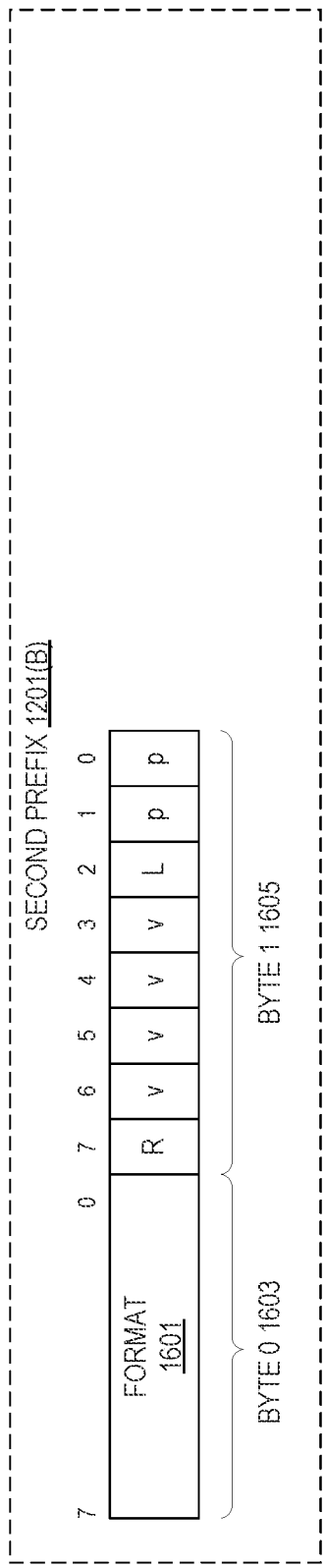
FIGS. 16A-B illustrate examples of a second prefix.
Figure 16B:
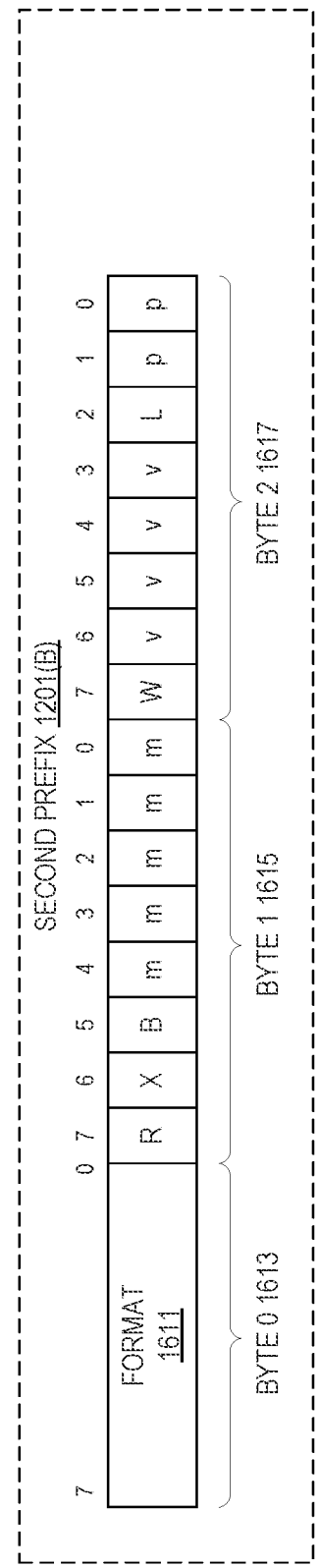
Figure 17:
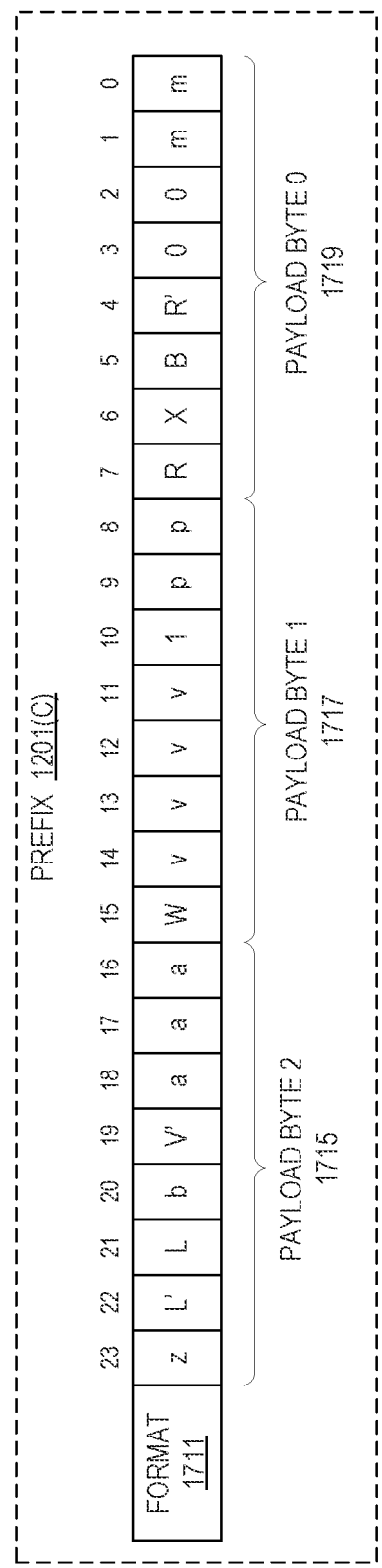
FIG. 17 illustrates examples of a third prefix.

At 501, an instance of single instruction is fetched. For example, an INSTRUCTION is fetched. The instruction includes fields for an opcode, a destination operand, first and second source operands, and an immediate operand. In some examples, a second prefix may be used (e.g., second prefix 1201(B); FIGS. 16A-B) with no writemask. In some examples, a third prefix may be used (e.g., third prefix 1201(C); FIG. 17) and the instruction further includes a field for a writemask (e.g., {k1}). In some examples the destination operand may be indicated by REG 1344 (FIG. 13). In some examples, the first source operands may be indicated by vvvv from the payload byte 1717 (FIG. 17), the byte 1 1605 (FIG. 16A), or the byte 2 1617 (FIG. 16B). In some examples, the second source operands may be indicated by at least R/M 1346 (FIG. 13). In some examples, the instruction is fetched from an instruction cache. The opcode indicates min-max operations to perform.

The fetched instruction is decoded at 503. For example, the fetched MINMAX instruction is decoded by decoder circuitry such as decoder circuitry 405 or decode circuitry 940 detailed herein.

Data values associated with the source operands of the decoded instruction are retrieved when the decoded instruction is scheduled at 505. For example, when one or more of the source operands are memory operands, the data from the indicated memory location is retrieved.

At 507, the decoded instruction is executed by execution circuitry (hardware) such as execution circuitry 309 shown in FIG. 3, execution circuitry 409 shown in FIG. 4, or execution cluster(s) 960 shown in FIG. 9B. In some examples, the instruction is committed or retired at 509.

For the MINMAX instruction, the execution will cause execution circuitry to perform the operations described in connection with FIG. 3. At 507, the execution circuitry may execute the decoded instruction to determine a particular operation of five or more minimum and maximum operations in accordance with a value of the immediate operand, perform the determined particular operation on the first source operand and the second source operand to return a result, and store the result into the destination operand. At 511, the value of the immediate operand indicates one of a minimum operation and a maximum operation, and the method 500 may further include executing the decoded instruction to return a symbolic floating-point datum as the result if any of the first source operand and the second source operand is a symbolic floating-point datum at 512. For example, the method 500 may include executing the decoded instruction to return a QNAN as the result if either of the first and second source operands is a NAN at 513.

In some examples, the value of the immediate operand indicates one of a minimum number operation and a maximum number operation at 521, and the method 500 may further include executing the decoded instruction to return the first source operand as the result if the first source operand is a number and the second source operand is any type of symbolic floating-point datum, and return the second source operand as the result if the second source operand is a number and the first source operand is any type of symbolic floating-point datum at 522. For example, the method 500 may include executing the decoded instruction to return the first source operand as the result if the first source operand is a number and the second source operand is a NAN, and return the second source operand as the result if the second source operand is a number and the first source operand is a NAN at 523.

In some examples, the value of the immediate operand indicates one of a minimum magnitude operation and a maximum magnitude operation at 531, and the method 500 may further include executing the decoded instruction to return a symbolic floating-point datum as the result if any of the first source operand and the second source operand is a symbolic floating-point datum at 532. For example, the method 500 may include executing the decoded instruction to return a QNAN as the result if either of the first and second source operands is a NAN at 533.

Figure 6A:
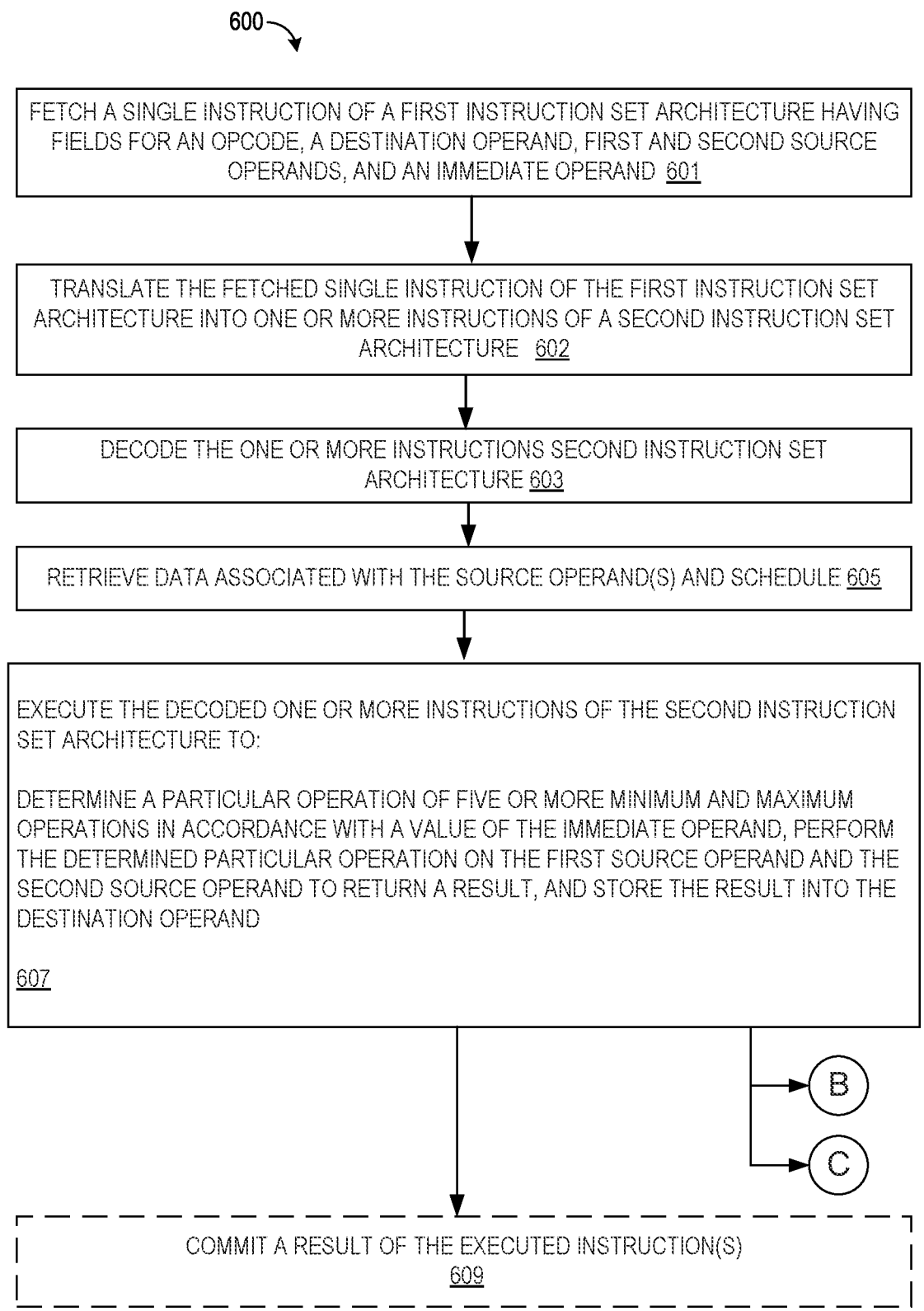
FIGS. 6A-C are illustrative diagrams of another example of a method to process an instruction in one implementation.
Figure 6B:
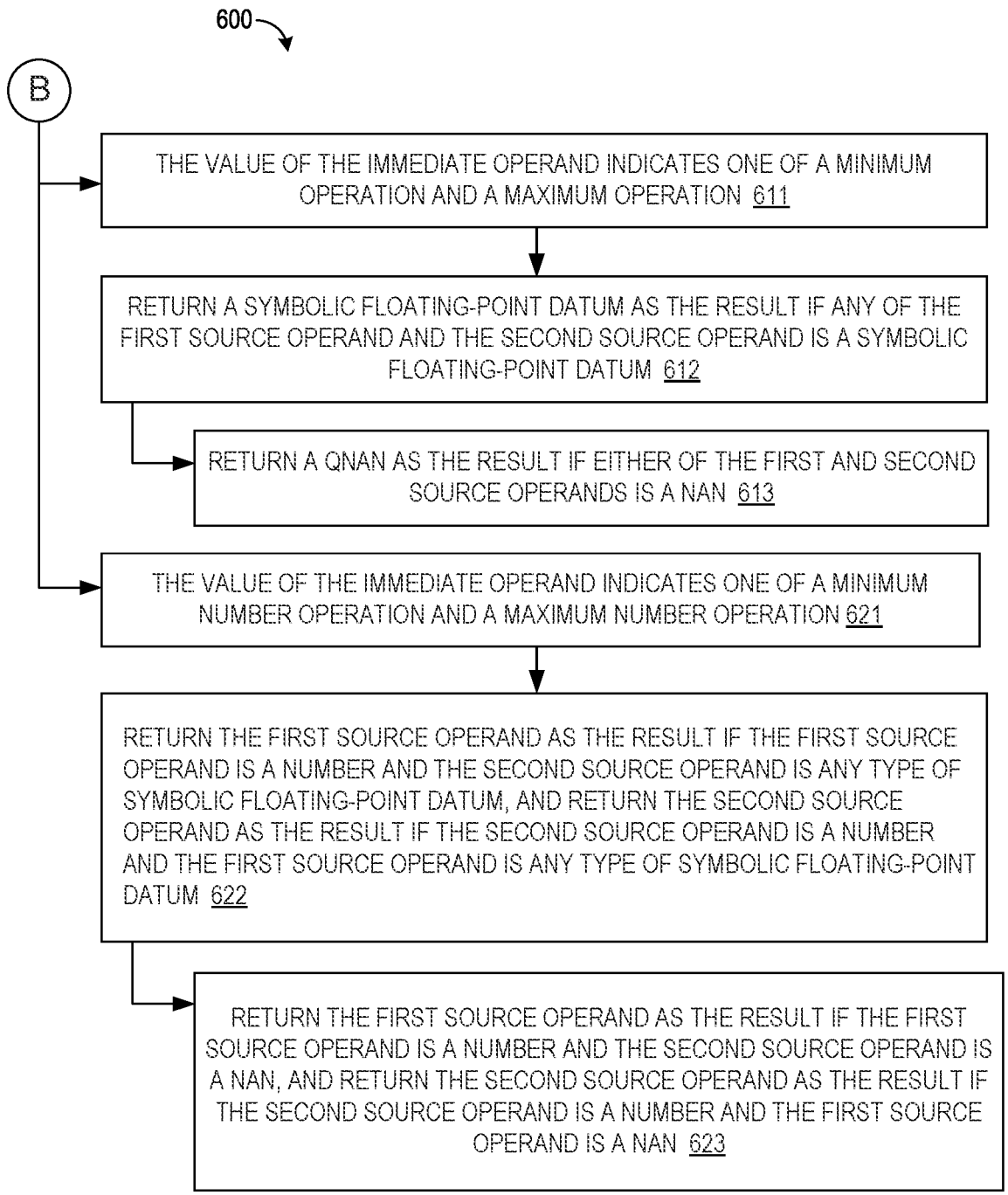
Figure 6C:
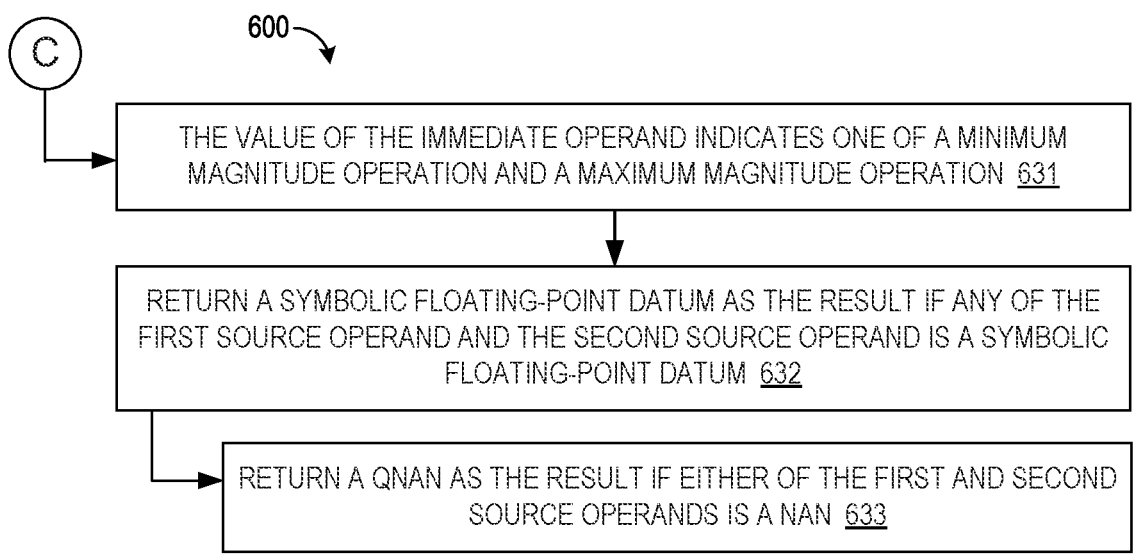

FIGS. 6A to 6C illustrate an example of method 600 to process a MINMAX instruction using emulation or binary translation. For example, a processor core as shown in FIG. 9B, a pipeline and/or emulation/translation layer perform aspects of this method.

An instance of a single instruction of a first instruction set architecture is fetched at 601. The instance of the single instruction of the first instruction set architecture including fields for an opcode, a destination operand, first and second source operands, and an immediate operand. In some examples, a second prefix may be used (e.g., second prefix 1201(B); FIGS. 16A-B) with no writemask. In some examples, a third prefix may be used (e.g., third prefix 1201(C); FIG. 17) and the instruction further includes a field for a writemask (e.g., {k1}). In some examples the destination operand may be indicated by REG 1344 (FIG. 13). In some examples, the first source operands may be indicated by vvvv from the payload byte 1717 (FIG. 17), the byte 1 1605 (FIG. 16A), or the byte 2 1617 (FIG. 16B). In some examples, the second source operands may be indicated by at least R/M 1346 (FIG. 13). In some examples, the instruction is fetched from an instruction cache. The opcode indicates min-max operations to perform.

The fetched single instruction of the first instruction set architecture is translated into one or more instructions of a second instruction set architecture at 602. This translation is performed by a translation and/or emulation layer of software in some examples. In some examples, this translation is performed by an instruction converter 1812 as shown in FIG. BPL. In some examples, the translation is performed by hardware translation circuitry.

The one or more translated instructions of the second instruction set architecture are decoded at 603. For example, the translated instructions are decoded by decoder circuitry such as decoder circuitry 405 or decode circuitry 940 detailed herein. In some examples, the operations of translation and decoding at 602 and 603 are merged.

Data values associated with the source operand(s) of the decoded one or more instructions of the second instruction set architecture are retrieved and the one or more instructions are scheduled at 605. For example, when one or more of the source operands are memory operands, the data from the indicated memory location is retrieved.

At 607, the decoded instruction(s) of the second instruction set architecture is/are executed by execution circuitry (hardware) such as execution circuitry 309 shown in FIG. 3, execution circuitry 409 shown in FIG. 4, or execution cluster(s) 960 shown in FIG. 9B, to perform the operation(s) indicated by the opcode of the single instruction of the first instruction set architecture. In some examples, the instruction is committed or retired at 609.

For the MINMAX instruction, the execution will cause execution circuitry to perform the operations described in connection with FIG. 3. At 607, the execution circuitry may execute the decoded instruction to determine a particular operation of five or more minimum and maximum operations in accordance with a value of the immediate operand, perform the determined particular operation on the first source operand and the second source operand to return a result, and store the result into the destination operand. At 611, the value of the immediate operand indicates one of a minimum operation and a maximum operation, and the method 600 may further include executing the decoded instruction to return a symbolic floating-point datum as the result if any of the first source operand and the second source operand is a symbolic floating-point datum at 612. For example, the method 600 may include executing the decoded instruction to return a QNAN as the result if either of the first and second source operands is a NAN at 613.

In some examples, the value of the immediate operand indicates one of a minimum number operation and a maximum number operation at 621, and the method 600 may further include executing the decoded instruction to return the first source operand as the result if the first source operand is a number and the second source operand is any type of symbolic floating-point datum, and return the second source operand as the result if the second source operand is a number and the first source operand is any type of symbolic floating-point datum at 622. For example, the method 600 may include executing the decoded instruction to return the first source operand as the result if the first source operand is a number and the second source operand is a NAN, and return the second source operand as the result if the second source operand is a number and the first source operand is a NAN at 623.

In some examples, the value of the immediate operand indicates one of a minimum magnitude operation and a maximum magnitude operation at 631, and the method 600 may further include executing the decoded instruction to return a symbolic floating-point datum as the result if any of the first source operand and the second source operand is a symbolic floating-point datum at 632. For example, the method 600 may include executing the decoded instruction to return a QNAN as the result if either of the first and second source operands is a NAN at 633.

Some implementations include instructions to perform floating-point min-max operations that adhere with the IEEE 754-2019 standard, section 9.6. Some supported datatype examples include half-precision floating point data represented with 16 bits (FP16), single-precision floating point data represented with 32 bits (FP32), double-precision floating point data represented with 64 bits (FP64) and brain floating point data represented with 16 bits (BF16). In some implementations, an example MINMAX instruction may operate on two vector registers, and may also include an 8-bit immediate control field to select the particular comparison to perform. In some implementations, an example MINMAX instruction may also include an override for the sign of the comparison result.

Table 1 shows an example minimum operation on two operands "a" and "b" in one implementation of a MINMAX instruction, where a minimum of "−0" and "+0" is −0.

TABLE 1

| b | a = QNAN1 | a = SNAN1 | a = Number or Infinity |
|---|---|---|---|
| b = QNAN2 | QNAN1 | Quiet(SNAN1) | QNAN2 |
| b = SNAN2 | Quiet(SNAN2) | Quiet(SNAN1) | Quiet(SNAN2) |
| b = Number or Infinity | QNAN1 | Quiet(SNAN1) | The minimum of a and b |

Table 2 shows an example minimum magnitude operation on two operands "a" and "b" in one implementation of a MINMAX instruction.

TABLE 2

| b | a = QNAN1 | a = SNAN1 | a = Number or Infinity |
|---|---|---|---|
| b = QNAN2 | QNAN1 | Quiet(SNAN1) | QNAN2 |
| b = SNAN2 | Quiet(SNAN2) | Quiet(SNAN1) | Quiet(SNAN2) |
| b = Number or Infinity | QNAN1 | Quiet(SNAN1) | The minimum magnitude of a and b |

Table 3 shows an example minimum number operation on two operands "a" and "b" in one implementation of a MINMAX instruction, where a minimum number of "−0" and "+0" is −0.

TABLE 3

| b | a = QNAN1 | a = SNAN1 | a = Number or Infinity |
|---|---|---|---|
| b = QNAN2 | QNAN1 | Quiet(SNAN1) | a |
| b = SNAN2 | Quiet(SNAN2) | Quiet(SNAN1) | a |
| b = Number or Infinity | b | b | The minimum of a and b |

Table 4 shows an example minimum magnitude number operation on two operands "a" and "b" in one implementation of a MINMAX instruction.

TABLE 4

| b | a = QNAN1 | a = SNAN1 | a = Number or Infinity |
|---|---|---|---|
| b = QNAN2 | QNAN1 | Quiet(SNAN1) | a |
| b = SNAN2 | Quiet(SNAN2) | Quiet(SNAN1) | a |
| b = Number or Infinity | b | b | The minimum magnitude of a and b |

Table 5 shows an example maximum operation on two operands "a" and "b" in one implementation of a MINMAX instruction, where a maximum of "−0" and "+0" is +0.

TABLE 5

| b | a = QNAN1 | a = SNAN1 | a = Number or Infinity |
|---|---|---|---|
| b = QNAN2 | QNAN1 | Quiet(SNAN1) | QNAN2 |
| b = SNAN2 | Quiet(SNAN2) | Quiet(SNAN1) | Quiet(SNAN2) |
| b = Number or Infinity | QNAN1 | Quiet(SNAN1) | The maximum of a and b |

Table 6 shows an example maximum magnitude operation on two operands "a" and "b" in one implementation of a MINMAX instruction.

TABLE 6

| b | a = QNAN1 | a = SNAN1 | a = Number or Infinity |
|---|---|---|---|
| b = QNAN2 | QNAN1 | Quiet(SNAN1) | QNAN2 |
| b = SNAN2 | Quiet(SNAN2) | Quiet(SNAN1) | Quiet(SNAN2) |
| b = Number or Infinity | QNAN1 | Quiet(SNAN1) | The maximum magnitude of a and b |

Table 7 shows an example maximum number operation on two operands "a" and "b" in one implementation of a MINMAX instruction, where a maximum number of "−0" and "+0 is +0.

TABLE 7

| b | a = QNAN1 | a = SNAN1 | a = Number or Infinity |
|---|---|---|---|
| b = QNAN2 | QNAN1 | Quiet(SNAN1) | a |
| b = SNAN2 | Quiet(SNAN2) | Quiet(SNAN1) | a |
| b = Number or Infinity | b | b | The maximum of a and b |

Table 8 shows an example maximum magnitude number operation on two operands "a" and "b" in one implementation of a MINMAX instruction.

TABLE 8

| | a | | |
|---|---|---|---|
| b | a = QNAN1 | a = SNAN1 | a = Number or Infinity |
| b = QNAN2 | QNAN1 | Quiet(SNAN1) | a |
| b = SNAN2 | Quiet(SNAN2) | Quiet(SNAN1) | a |
| b = Number or Infinity | b | b | The maximum magnitude of a and b |

A non-limiting example pseudo-code for a minimum operation is as follows:

```
def minimum(a, b) :
  if a is SNAN or (a is QNAN and b is not SNAN):
    return QNAN(a)
  else if b is NAN:
    return QNAN(b)
  else if (a = = +0.0 and b = = −0.0) or (a = = −0.0 and b = = +0.0):
    return −0.0
  else if a <= b:
    return a
  else:
    return b
```

A non-limiting example pseudo-code for a minimum number operation is as follows:

```
def minimum_number(a, b):
  if a is NAN and b is NAN:
    if a is SNAN or (a is QNAN and b is QNAN):
      return QNAN(a)
    else: // a is QNAN and b is SNAN
      return QNAN(b)
  else if a is NAN:
    return b
  else if b is NAN:
    return a
  else if (a = = +0.0 and b = = −0.0) or (a = = −0.0 and b = = +0.0):
    return −0.0
  else if a <= b:
    return a
  else:
    return b
```

A non-limiting example pseudo-code for a minimum magnitude operation is as follows:

```
def minimum_magnitude(a, b):
  if a is SNAN or (a is QNAN and b is not SNAN):
    return QNAN(a)
  else if b is NAN:
    return QNAN(b)
  else if abs(a) <= abs(b):
    return a
  else:
    return b
```

A non-limiting example pseudo-code for a minimum magnitude number operation is as follows:

```
def minimum_magnitude_number(a, b):
  if a is NAN and b is NAN:
    if a is SNAN or (a is QNAN and b is QNAN):
      return QNAN(a)
    else: // a is QNAN and b is SNAN
      return QNAN(b)
  else if a is NAN:
    return b
  else if b is NAN:
    return a
  else if abs(a) <= abs(b):
    return a
  else:
    return b
```

A non-limiting example pseudo-code for a maximum operation is as follows:

```
def maximum(a, b) :
  if a is SNAN or (a is QNAN and b is not SNAN):
    return QNAN(a)
  else if b is NAN:
    return QNAN(b)
  else if (a = = +0.0 and b = = −0.0) or (a = = −0.0 and b = = +0.0):
    return +0.0
  else if a >= b:
    return a
  else:
    return b
```

A non-limiting example pseudo-code for a maximum number operation is as follows:

```
def maximum_number (a, b):
  if a is NAN and b is NAN:
    if a is SNAN or (a is QNAN and b is QNAN):
      return QNAN(a)
    else: // a is QNAN and b is SNAN
      return QNAN(b)
  else if a is NAN:
    return b
  else if b is NAN:
    return a
  else if (a = = +0.0 and b = = −0.0) or (a = = −0.0 and b = = +0.0):
    return +0.0
  else if a >= b:
    return a
  else:
    return b
```

A non-limiting example pseudo-code for a maximum magnitude operation is as follows:

```
def maximum_magnitude(a, b) :
  if a is SNAN or (a is QNAN and b is not SNAN):
    return QNAN(a)
  else if b is NAN:
    return QNAN(b)
  else if abs(a) >= abs(b):
    return a
  else:
    return b
```

A non-limiting example pseudo-code for a maximum magnitude number operation is as follows:

```
def maximum_magnitude_number(a, b) :
  if a is NAN and b is NAN:
    if a is SNAN or (a is QNAN and b is QNAN):
      return QNAN(a)
    else: // a is QNAN and b is SNAN
      return QNAN(b)
  else if a is NAN:
```

```
        return b
    else if b is NAN:
        return a
    else if abs (a) >= abs (b):
        return a
    else:
        return b
```

Table 9 describes an example of a MINMAX comparison operation selection according to an example immediate control field imm8 for bits imm8[4] and imm8[1:0]:

TABLE 9

| imm8[4]-min/max | imm8[1:0]-Operation select | Operation |
|---|---|---|
| 0b0 | 0b00 | Minimum |
| 0b0 | 0b01 | Minimum Number |
| 0b0 | 0b10 | Minimum Magnitude |
| 0b0 | 0b11 | Minimum Magnitude Number |
| 0b1 | 0b00 | Maximum |
| 0b1 | 0b01 | Maximum Number |
| 0b1 | 0b10 | Maximum Magnitude |
| 0b1 | 0b11 | Maximum Magnitude Number |

Table 10 describes an example of a MINMAX sign control override according to the example immediate control field imm8 for bits imm8[3:2]:

TABLE 10

| imm8[3:2] Sign control | Sign |
|---|---|
| 0b00 | Select sign (src1) |
| 0b01 | Select sign (compare result) |
| 0b10 | Set sign to 0 |
| 0b11 | Set sign to 1 |

In some implementations, the sign control indication ignores NAN signs. For example, execution of the MINMAX instruction does not manipulate the sign if the result is a NAN, and does not copy the sign of SRC1 (for sign control=0b00) if SRC1 is a NAN. In some implementations, the MINMAX instruction raises an invalid exception (#IE) if either of the operands is an SNAN, and a denormal exception (#DE) if either operand is a denormal and none of the operands are NAN.

The following example pseudocode describes how the 8-bit immediate controls both the comparison operation and the sign control (where the operands 'daz' and 'except' are additional parameters controlling denormal handling and exception reporting):

```
def minmax(a, b, imm, daz, except):
    op_select := imm[1:0]
    sign_control := imm[3:2]
    minmax_select := imm[4]
    if except = = true:
        if a is SNAN or b is SNAN:
            set #IE
        else if a is QNAN or b is QNAN:
            // QNAN prevents lower-priority exceptions
        else if a is denormal or b is denormal:
            set #DE
    if daz = = true:
        if a is denormal :
            a.fraction := 0
        if b is denormal:
            b.fraction := 0
    if minmax_select = = 0: //min
        if op_select = = 0:
            tmp := minimum(a, b)
        else if op_select = = 1:
            tmp : = minimum_number(a, b)
        else if op_select = = 2:
            tmp := minimum_magnitude(a, b)
        else: //op_select = = 3
            tmp := minimum_magnitude_number(a, b)
    else: //max
        if op_select = = 0:
            tmp := maximum(a, b)
        else if op_select = = 1:
            tmp : = maximum_number(a, b)
        else if op_select = = 2:
            tmp := maximum_magnitude(a, b)
        else: //op_select = = 3
            tmp := maximum_magnitude_number(a, b)
    if tmp is not NAN:
        if (sign_control = = 0) and a is not NAN:
            tmp.sign := a.sign
        else if sign_control = = 1:
            // keep sign of comparison result
        else if sign_control = = 2:
            tmp.sign := 0
        else: //sign_control = = 3
            tmp.sign := 1
    return tmp
```

In some examples, such as the following examples, a control and status register (e.g., a MXCSR register) may provide the DAZ indication. An example instruction pseudo-code for 64-bit floating point min-max operations (vector and scalar) is as follows:

```
VMINMAXPD dest {kl}, src1, src2, imm8
VL = 128, 256 or 512
KL := VL / 64
for i := 0 to KL-1:
    if kl[i] or •no writemask•:
        if src2 is memory and (EVEX.b = = 1):
            dest.f64[i] := minmax(src1.f64[i], src2.f64[0],
                imm8, daz=MXCSR.DAZ, except=true)
        else :
            dest.f64[i] := minmax(src1.f64[i], src2.f64[i],
                imm8, daz=MXCSR.DAZ, except=true)
    else if •zeroing•:
        dest.f64[i] := 0
    //else dest.f64[i] remains unchanged
dest[MAX_VL-1:VL] := 0
VMINMAXSD dest {kl}, src1, src2, imm8
VL = 128, 256 or 512
if kl[0] or •no writemask• :
    dest.f64[0] := minmax(src1.f64[0], src2.f64[0],
        imm8, daz=MXCSR.DAZ, except=true)
else if •zeroing* :
    dest.f64[0] := 0
//else dest.f64 [0] remains unchanged
dest[127:64] := src 1 [127:64]
dest[MAX_VL-1:VL] := 0
```

An example instruction pseudocode for 32-bit floating point min/max operations (vector and scalar) is as follows:

```
VMINMAXPS dest {kl}, src1, src2, imm8
VL = 128, 256 or 512
KL := VL / 32
for i := 0 to KL-1:
    if kl [i] or •no writemask•:
        if src2 is memory and (EVEX.b = = 1):
            dest.f32[i] := minmax(src1.f32[i], src2.f32[0],
                imm8, daz=MXCSR.DAZ, except=true)
        else:
            dest.f32 [i] := minmax(src1.f32[i],src2.f32[i],
```

```
        imm8, daz=MXCSR.DAZ, except=true)
    else if •zeroing•:
        dest.f32[i] := 0
    //else dest.f32[i] remains unchanged
dest[MAX_VL-1:VL] := 0
VMINMAXSS dest {kl}, src1, src2, imm8
VL = 128, 256 or 512
if kl[0] or •no writemask* :
    dest.f32[0] := minmax(src1.f32[0], src2.f32[0],
        imm8, daz=MXCSR.DAZ, except=true)
else if •zeroing* :
    dest.f32[0] := 0
//else dest.f32[0] remains unchanged
dest[127:32] := src 1 [127:32]
dest[MAX_VL-1:VL] := 0
```

An example instruction pseudocode for 16-bit floating point min/max operations (vector and scalar) is as follows:

```
VMINMAXPH dest {kl}, src1, src2, imm8
VL = 128, 256 or 512
KL := VL / 16
for i := 0 to KL - 1:
    if kl[i] or *no writemask*:
        if src2 is memory and (EVEX.b = = 1):
            dest f16[i] := minmax(srcl.f16[i], src2.f16[0],
                imm8, daz=false, except=true)
        else :
            dest.f16[i] := minmax(srcl.f16[i], src2.f16[i],
                imm8, daz=false, except=true)
    else if •zeroing* :
        dest.f16[i] := 0
    //else dest.f16[i] remains unchanged
dest[MAX_VL-1:VL] := 0
VMINMAXSH dest {kl}, src1, src2, imm8
VL = 128, 256 or 512
if kl[0] or •no writemask* :
    dest.f16[0] := minmax(src1.f16[0], src2.f16[0],
        imm8, daz=false, except=true)
else if •zeroing* :
    dest.f16[0] := 0
//else dest.f16[0] remains unchanged
dest[127:16] := src1 [127:16]
dest[MAX_VL-1:VL] := 0
```

An example instruction pseudocode for bfloat 16-bit floating point min/max operations (where the pseudocode shows vector only, no exceptions and treating denormals as zero, but the same can be extended to scalar and full exception/denormal support) is as follows:

```
VMINMAXNEPBF16 dest {kl}, src1, src2, imm8
VL = 128, 256 or 512
KL := VL / 16
for i := 0 to KL - 1:
    if kl[i] or *no writemask *:
        if src2 is memory and (EVEX.b = = 1):
            dest bf16[i] := minmax(srcl.bf16[i], src2.bf16[0],
                imm8, daz=true, except=false)
        else :
            dest.bf16[i] := minmax(srcl.bf16[i], src2.bf16[i],
                imm8, daz=true, except=false)
    else if •zeroing* :
    dest.bf16[i] := 0)
    //else dest.bf16[i] remains unchanged
dest[MAX_VL-1:VL] := 0
```

Exemplary Computer Architectures

Detailed below are describes of exemplary computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 7:
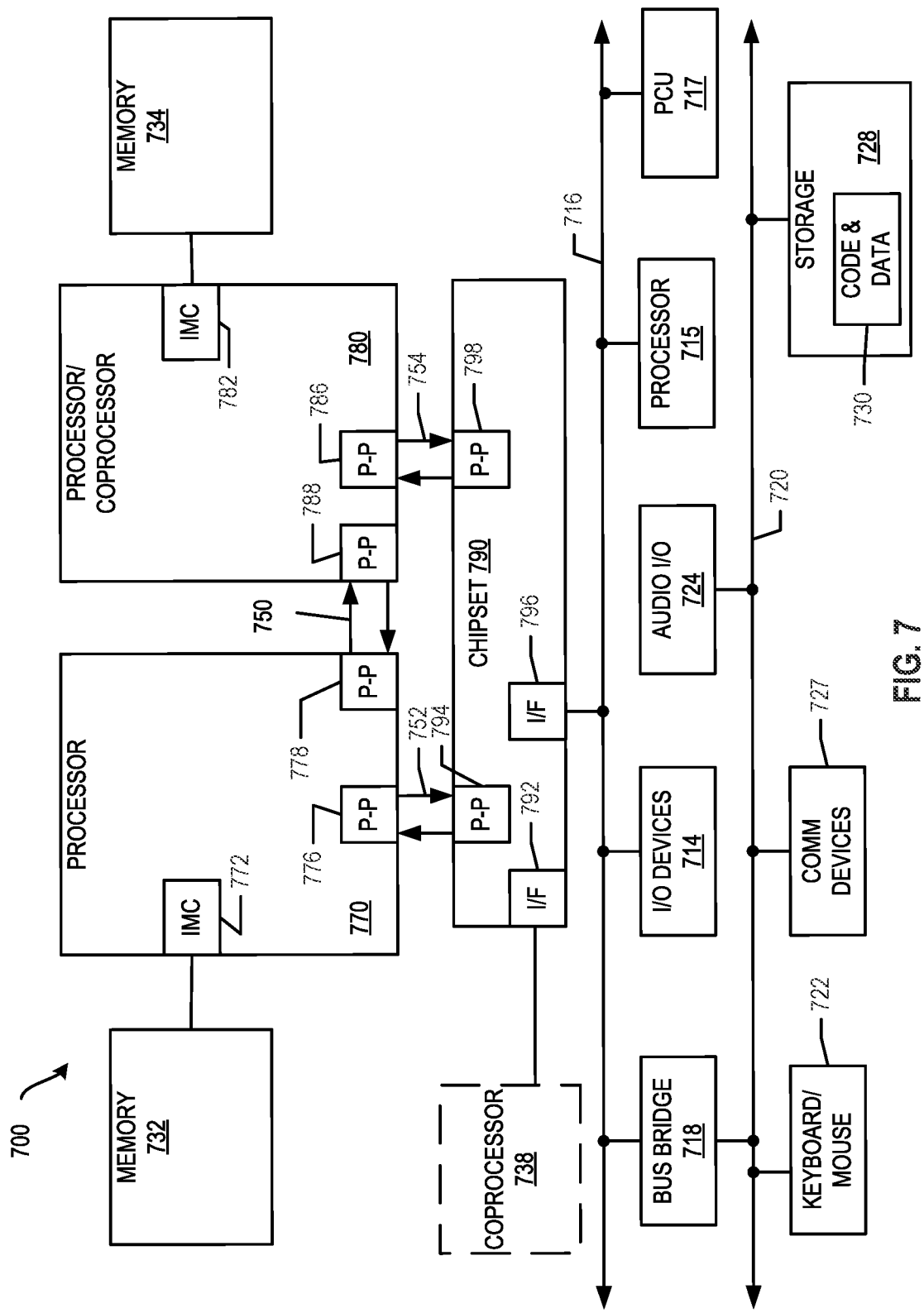
FIG. 7 illustrates an exemplary system.

FIG. 7 illustrates an exemplary system. Multiprocessor system 700 is a point-to-point interconnect system and includes a plurality of processors including a first processor 770 and a second processor 780 coupled via a point-to-point interconnect 750. In some examples, the first processor 770 and the second processor 780 are homogeneous. In some examples, first processor 770 and the second processor 780 are heterogenous. Though the exemplary system 700 is shown to have two processors, the system may have three or more processors, or may be a single processor system.

Processors 770 and 780 are shown including integrated memory controller (IMC) circuitry 772 and 782, respectively. Processor 770 also includes as part of its interconnect controller point-to-point (P-P) interfaces 776 and 778; similarly, second processor 780 includes P-P interfaces 786 and 788. Processors 770, 780 may exchange information via the point-to-point (P-P) interconnect 750 using P-P interface circuits 778, 788. IMCs 772 and 782 couple the processors 770, 780 to respective memories, namely a memory 732 and a memory 734, which may be portions of main memory locally attached to the respective processors.

Processors 770, 780 may each exchange information with a chipset 790 via individual P-P interconnects 752, 754 using point to point interface circuits 776, 794, 786, 798. Chipset 790 may optionally exchange information with a coprocessor 738 via an interface 792. In some examples, the coprocessor 738 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 770, 780 or outside of both processors, yet connected with the processors via P-P interconnect, such that either or both processors' local cache information may be stored in the shared cache if a processor is placed into a low power mode.

Chipset 790 may be coupled to a first interconnect 716 via an interface 796. In some examples, first interconnect 716 may be a Peripheral Component Interconnect (PCI) interconnect, or an interconnect such as a PCI Express interconnect or another I/O interconnect. In some examples, one of the interconnects couples to a power control unit (PCU) 717, which may include circuitry, software, and/or firmware to perform power management operations with regard to the processors 770, 780 and/or co-processor 738. PCU 717 provides control information to a voltage regulator (not shown) to cause the voltage regulator to generate the appropriate regulated voltage. PCU 717 also provides control information to control the operating voltage generated. In various examples, PCU 717 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 717 is illustrated as being present as logic separate from the processor 770 and/or processor 780. In other cases, PCU 717 may execute on a given one or more of cores (not shown) of processor 770 or 780. In some cases, PCU 717 may be implemented as a microcontroller (dedicated or general-purpose) or other control logic configured to execute its own dedicated power management code, sometimes referred to as P-code. In yet other examples, power management operations to be performed by PCU 717 may be implemented externally to a processor, such as by way of a separate power management integrated circuit (PMIC) or another component external to the processor. In yet other examples, power management operations to be performed by PCU 717 may be implemented within BIOS or other system software.

Various I/O devices 714 may be coupled to first interconnect 716, along with a bus bridge 718 which couples first interconnect 716 to a second interconnect 720. In some examples, one or more additional processor(s) 715, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interconnect 716. In some examples, second interconnect 720 may be a low pin count (LPC) interconnect. Various devices may be coupled to second interconnect 720 including, for example, a keyboard and/or mouse 722, communication devices 727 and a storage circuitry 728. Storage circuitry 728 may be one or more non-transitory machine-readable storage media as described below, such as a disk drive or other mass storage device which may include instructions/code and data 730 and may implement the storage 403 in some examples. Further, an audio I/O 724 may be coupled to second interconnect 720. Note that other architectures than the point-to-point architecture described above are possible. For example, instead of the point-to-point architecture, a system such as multiprocessor system 700 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 8:
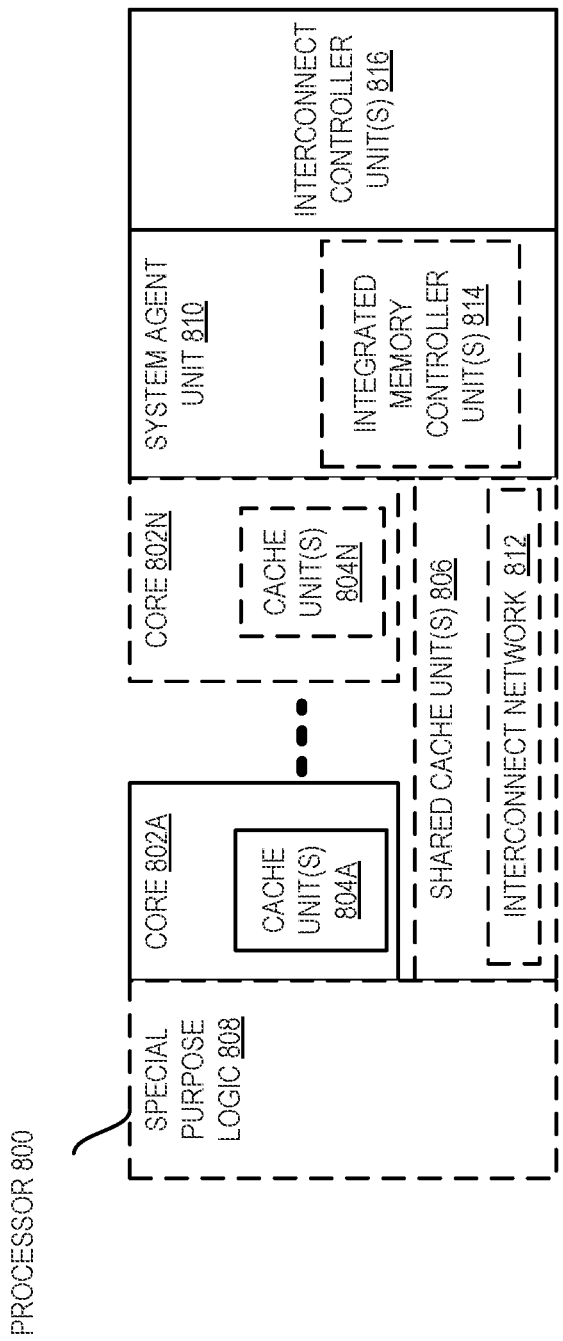
FIG. 8 illustrates a block diagram of an example processor that may have more than one core and an integrated memory controller.

FIG. 8 illustrates a block diagram of an example processor 800 that may have more than one core and an integrated memory controller. The solid lined boxes illustrate a processor 800 with a single core 802A, a system agent unit circuitry 810, a set of one or more interconnect controller unit(s) circuitry 816, while the optional addition of the dashed lined boxes illustrates an alternative processor 800 with multiple cores 802(A)-(N), a set of one or more integrated memory controller unit(s) circuitry 814 in the system agent unit circuitry 810, and special purpose logic 808, as well as a set of one or more interconnect controller units circuitry 816. Note that the processor 800 may be one of the processors 770 or 780, or co-processor 738 or 715 of FIG. 7.

Thus, different implementations of the processor 800 may include: 1) a CPU with the special purpose logic 808 being integrated graphics and/or scientific (throughput) logic (which may include one or more cores, not shown), and the cores 802(A)-(N) being one or more general purpose cores (e.g., general purpose in-order cores, general purpose out-of-order cores, or a combination of the two); 2) a coprocessor with the cores 802(A)-(N) being a large number of special purpose cores intended primarily for graphics and/or scientific (throughput); and 3) a coprocessor with the cores 802(A)-(N) being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 804(A)-(N) within the cores 802(A)-(N), a set of one or more shared cache unit(s) circuitry 806, and external memory (not shown) coupled to the set of integrated memory controller unit(s) circuitry 814. The set of one or more shared cache unit(s) circuitry 806 may include one or more mid-level caches, such as level 2 (L2), level 3 (L3), level 4 (L4), or other levels of cache, such as a last level cache (LLC), and/or combinations thereof. While in some examples ring-based interconnect network circuitry 812 interconnects the special purpose logic 808 (e.g., integrated graphics logic), the set of shared cache unit(s) circuitry 806, and the system agent unit circuitry 810, alternative examples use any number of well-known techniques for interconnecting such units. In some examples, coherency is maintained between one or more of the shared cache unit(s) circuitry 806 and cores 802(A)-(N).

In some examples, one or more of the cores 802(A)-(N) are capable of multi-threading. The system agent unit circuitry 810 includes those components coordinating and operating cores 802(A)-(N). The system agent unit circuitry 810 may include, for example, power control unit (PCU) circuitry and/or display unit circuitry (not shown). The PCU may be or may include logic and components needed for regulating the power state of the cores 802(A)-(N) and/or the special purpose logic 808 (e.g., integrated graphics logic). The display unit circuitry is for driving one or more externally connected displays.

The cores 802(A)-(N) may be homogenous in terms of instruction set architecture (ISA). Alternatively, the cores 802(A)-(N) may be heterogeneous in terms of ISA; that is, a subset of the cores 802(A)-(N) may be capable of executing an ISA, while other cores may be capable of executing only a subset of that ISA or another ISA.

Exemplary Core Architectures—In-Order and Out-of-Order Core Block Diagram

Figure 9A:
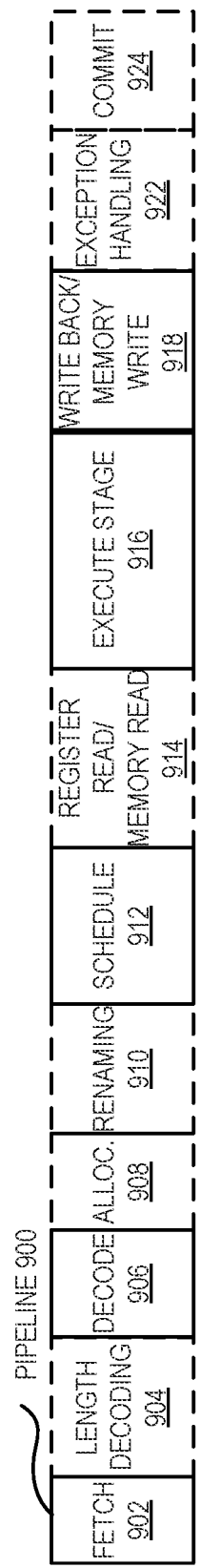
FIG. 9A is a block diagram illustrating both an exemplary in-order pipeline and an exemplary register renaming, out-of-order issue/execution pipeline according to examples.
Figure 9B:
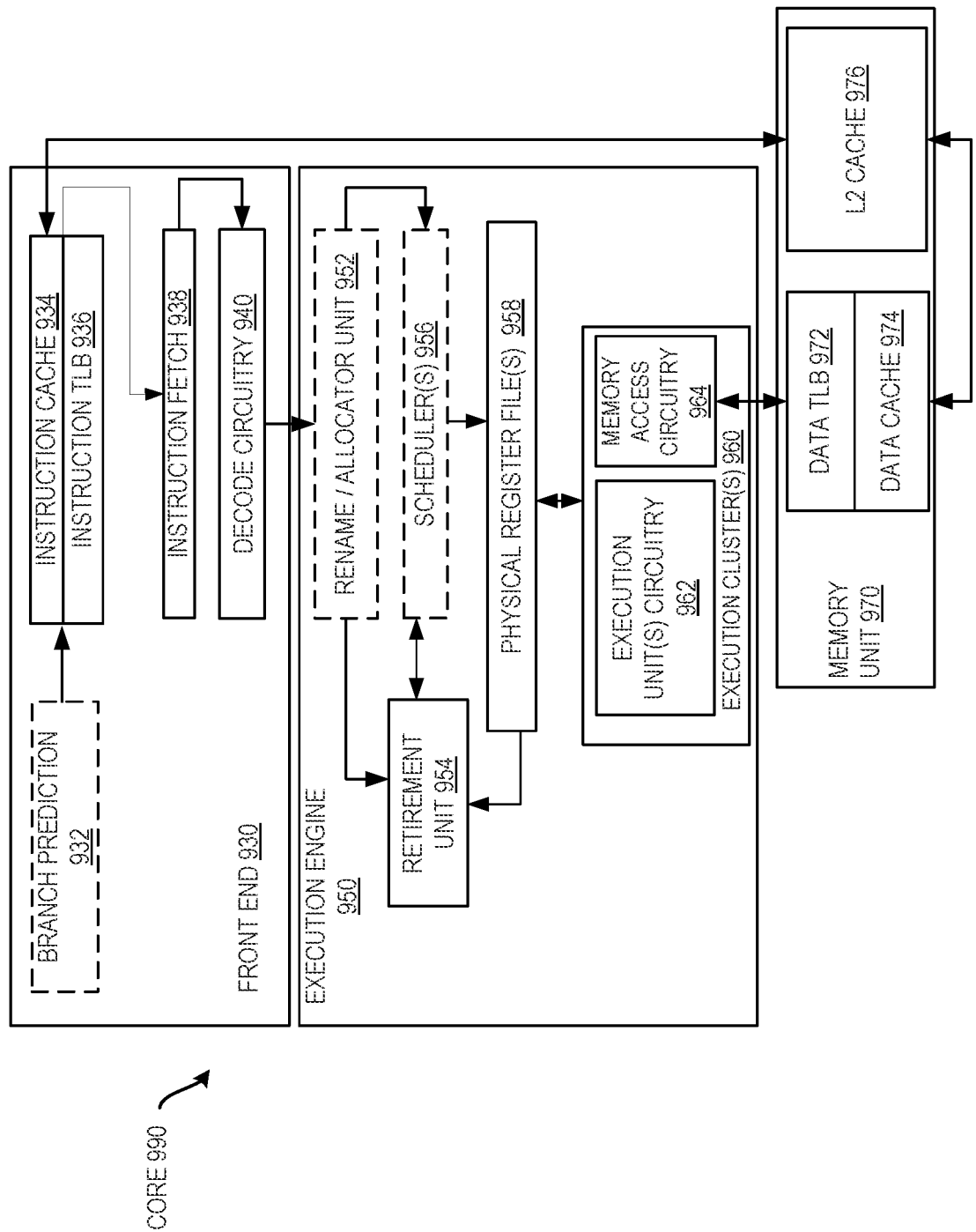
FIG. 9B is a block diagram illustrating both an exemplary example of an in-order architecture core and an exemplary register renaming, out-of-order issue/execution architecture core to be included in a processor according to examples.

FIG. 9A is a block diagram illustrating both an exemplary in-order pipeline and an exemplary register renaming, out-of-order issue/execution pipeline according to examples. FIG. 9B is a block diagram illustrating both an exemplary example of an in-order architecture core and an exemplary register renaming, out-of-order issue/execution architecture core to be included in a processor according to examples. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, an optional length decoding stage 904, a decode stage 906, an optional allocation (Alloc) stage 908, an optional renaming stage 910, a schedule (also known as a dispatch or issue) stage 912, an optional register read/memory read stage 914, an execute stage 916, a write back/memory write stage 918, an optional exception handling stage 922, and an optional commit stage 924. One or more operations can be performed in each of these processor pipeline stages. For example, during the fetch stage 902, one or more instructions are fetched from instruction memory, and during the decode stage 906, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 906 and the register read/memory read stage 914 may be combined into one pipeline stage. In one example, during the execute stage 916, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution architecture core of FIG. 9B may implement the pipeline 900 as follows: 1) the instruction fetch circuitry 938 performs the fetch and length decoding stages 902 and 904; 2) the decode circuitry 940 performs the decode stage 906; 3) the rename/allocator unit circuitry 952 performs the allocation stage 908 and renaming stage 910; 4) the scheduler(s) circuitry 956 performs the schedule stage 912; 5) the physical register file(s) circuitry 958 and the memory unit circuitry 970 perform the register read/memory read stage 914; the execution cluster(s) 960 perform the execute stage 916; 6) the memory unit circuitry 970 and the physical register file(s) circuitry 958 perform the write back/memory write stage 918; 7) various circuitry may be involved in the exception handling stage 922; and 8) the retirement unit circuitry 954 and the physical register file(s) circuitry 958 perform the commit stage 924.

FIG. 9B shows a processor core 990 including front-end unit circuitry 930 coupled to an execution engine unit circuitry 950, and both are coupled to a memory unit circuitry 970. The core 990 may be a reduced instruction set architecture computing (RISC) core, a complex instruction set architecture computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit circuitry 930 may include branch prediction circuitry 932 coupled to an instruction cache circuitry 934, which is coupled to an instruction translation lookaside buffer (TLB) 936, which is coupled to instruction fetch circuitry 938, which is coupled to decode circuitry 940. In one example, the instruction cache circuitry 934 is included in the memory unit circuitry 970 rather than the front-end circuitry 930. The decode circuitry 940 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 940 may further include an address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 940 may be implemented using various different mechanisms. Examples of suitable mechanisms include, but are not limited to, look-up tables, hardware implementations, programmable logic arrays (PLAs), microcode read only memories (ROMs), etc. In one example, the core 990 includes a microcode ROM (not shown) or other medium that stores microcode for certain macroinstructions (e.g., in decode circuitry 940 or otherwise within the front end circuitry 930). In one example, the decode circuitry 940 includes a micro-operation (micro-op) or operation cache (not shown) to hold/cache decoded operations, micro-tags, or micro-operations generated during the decode or other stages of the processor pipeline 900. The decode circuitry 940 may be coupled to rename/allocator unit circuitry 952 in the execution engine circuitry 950.

The execution engine circuitry 950 includes the rename/allocator unit circuitry 952 coupled to a retirement unit circuitry 954 and a set of one or more scheduler(s) circuitry 956. The scheduler(s) circuitry 956 represents any number of different schedulers, including reservations stations, central instruction window, etc. In some examples, the scheduler(s) circuitry 956 can include arithmetic logic unit (ALU) scheduler/scheduling circuitry, ALU queues, arithmetic generation unit (AGU) scheduler/scheduling circuitry, AGU queues, etc. The scheduler(s) circuitry 956 is coupled to the physical register file(s) circuitry 958. Each of the physical register file(s) circuitry 958 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 958 includes vector registers unit circuitry, writemask registers unit circuitry, and scalar register unit circuitry. These register units may provide architectural vector registers, vector mask registers, general-purpose registers, etc. The physical register file(s) circuitry 958 is coupled to the retirement unit circuitry 954 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 954 and the physical register file(s) circuitry 958 are coupled to the execution cluster(s) 960. The execution cluster(s) 960 includes a set of one or more execution unit(s) circuitry 962 and a set of one or more memory access circuitry 964. The execution unit(s) circuitry 962 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 956, physical register file(s) circuitry 958, and execution cluster(s) 960 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 964). It should also be understood that where separate pipelines are used, one or more of these pipelines may be out-of-order issue/execution and the rest in-order.

In some examples, the execution engine unit circuitry 950 may perform load store unit (LSU) address/data pipelining to an Advanced Microcontroller Bus (AMB) interface (not shown), and address phase and writeback, data phase load, store, and branches.

The set of memory access circuitry 964 is coupled to the memory unit circuitry 970, which includes data TLB circuitry 972 coupled to a data cache circuitry 974 coupled to a level 2 (L2) cache circuitry 976. In one exemplary example, the memory access circuitry 964 may include a load unit circuitry, a store address unit circuit, and a store data unit circuitry, each of which is coupled to the data TLB circuitry 972 in the memory unit circuitry 970. The instruction cache circuitry 934 is further coupled to the level 2 (L2) cache circuitry 976 in the memory unit circuitry 970. In one example, the instruction cache 934 and the data cache 974 are combined into a single instruction and data cache (not shown) in L2 cache circuitry 976, a level 3 (L3) cache circuitry (not shown), and/or main memory. The L2 cache circuitry 976 is coupled to one or more other levels of cache and eventually to a main memory.

The core 990 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 990 includes logic to support a packed data instruction set architecture extension (e.g., AVX1, AVX2), thereby allowing the operations used by many multimedia applications to be performed using packed data.

Exemplary Execution Unit(s) Circuitry

Figure 10:
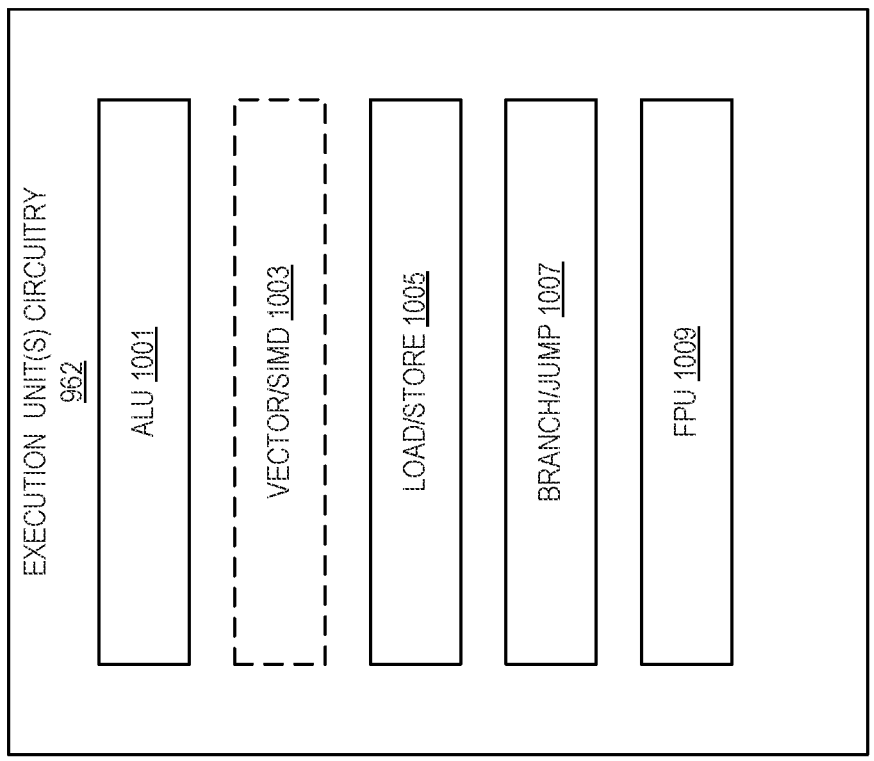
FIG. 10 illustrates examples of execution unit(s) circuitry.

FIG. 10 illustrates examples of execution unit(s) circuitry, such as execution unit(s) circuitry 962 of FIG. 9B. As illustrated, execution unit(s) circuitry 962 may include one or more ALU circuits 1001, optional vector/single instruction multiple data (SIMD) circuits 1003, load/store circuits 1005, branch/jump circuits 1007, and/or Floating-point unit (FPU) circuits 1009. ALU circuits 1001 perform integer arithmetic and/or Boolean operations. Vector/SIMD circuits 1003 perform vector/SIMD operations on packed data (such as SIMD/vector registers). Load/store circuits 1005 execute load and store instructions to load data from memory into registers or store from registers to memory. Load/store circuits 1005 may also generate addresses. Branch/jump circuits 1007 cause a branch or jump to a memory address depending on the instruction. FPU circuits 1009 perform floating-point arithmetic. The width of the execution unit(s) circuitry 962 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Exemplary Register Architecture

Figure 11:
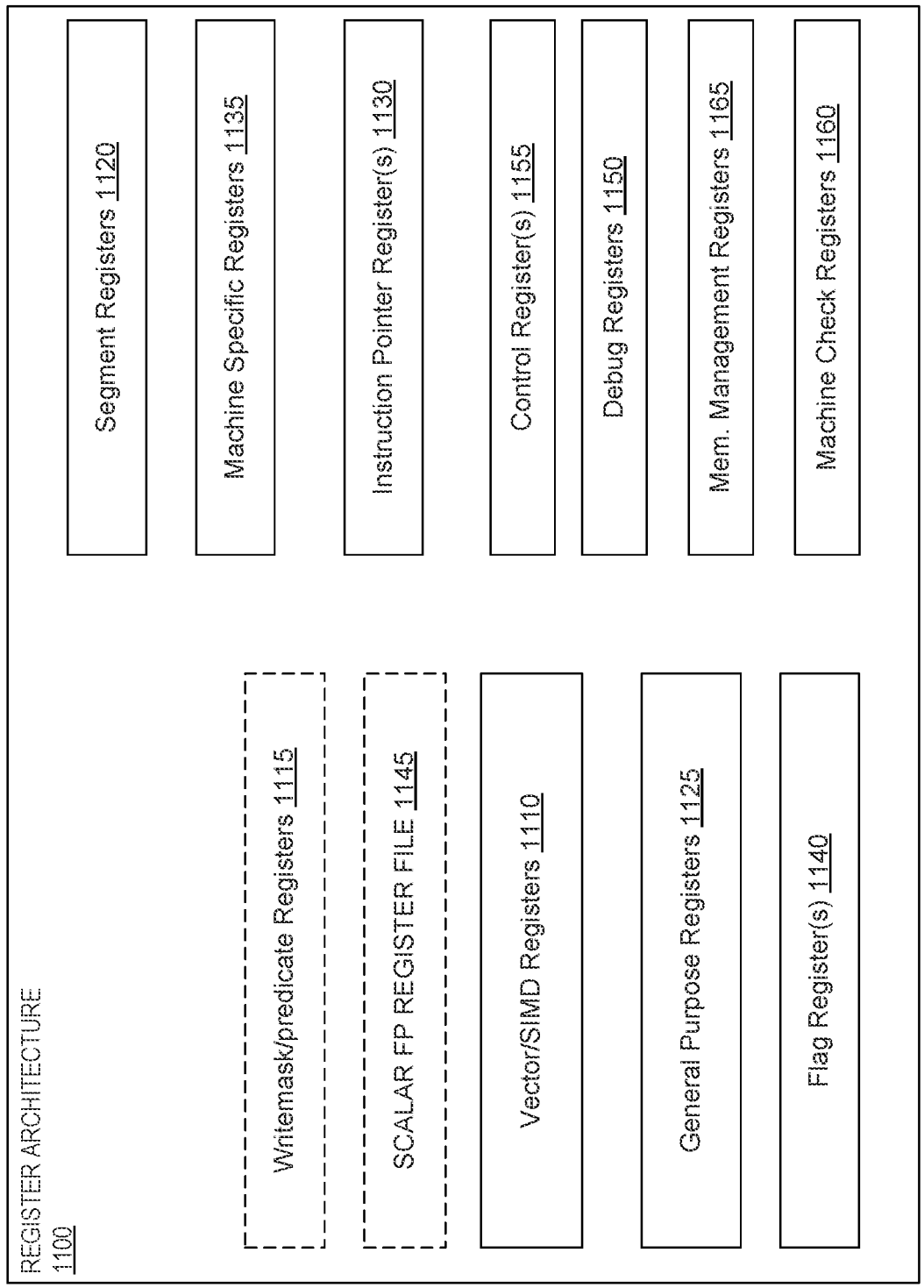
FIG. 11 is a block diagram of a register architecture according to some examples.

FIG. 11 is a block diagram of a register architecture 1100 according to some examples. As illustrated, the register architecture 1100 includes vector/SIMD registers 1110 that vary from 128-bit to 1,024 bits width. In some examples, the vector/SIMD registers 1110 are physically 512-bits and, depending upon the mapping, only some of the lower bits are used. For example, in some examples, the vector/SIMD registers 1110 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1100 includes writemask/predicate registers 1115. For example, in some examples, there are 8 writemask/predicate registers (sometimes called k0 through k7) that are each 16-bit, 32-bit, 64-bit, or 128-bit in size. Writemask/predicate registers 1115 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1115 corresponds to a data element position of the destination. In other examples, the writemask/predicate registers 1115 are scalable and consists of a set number of enable bits for a given vector element (e.g., 8 enable bits per 64-bit vector element).

The register architecture 1100 includes a plurality of general-purpose registers 1125. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1100 includes scalar floating-point (FP) register 1145 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1140 (e.g., EFLAGS, RFLAGS, etc.) store status and control information for arithmetic, compare, and system operations. For example, the one or more flag registers 1140 may store condition code information such as carry, parity, auxiliary carry, zero, sign, and overflow. In some examples, the one or more flag registers 1140 are called program status and control registers.

Segment registers 1120 contain segment points for use in accessing memory. In some examples, these registers are referenced by the names CS, DS, SS, ES, FS, and GS.

Machine specific registers (MSRs) 1135 control and report on processor performance. Most MSRs 1135 handle system-related functions and are not accessible to an application program. Machine check registers 1160 consist of control, status, and error reporting MSRs that are used to detect and report on hardware errors.

One or more instruction pointer register(s) 1130 store an instruction pointer value. Control register(s) 1155 (e.g., CR0-CR4) determine the operating mode of a processor (e.g., processor 770, 780, 738, 715, and/or 800) and the characteristics of a currently executing task. Debug registers 1150 control and allow for the monitoring of a processor or core's debugging operations.

Memory (mem) management registers 1165 specify the locations of data structures used in protected mode memory management. These registers may include a GDTR, IDRT, task register, and a LDTR register.

Alternative examples may use wider or narrower registers. Additionally, alternative examples may use more, less, or different register files and registers. The register architecture 1100 may, for example, be used in register file/ memory 408, or physical register file(s) circuitry 9 58.

Instruction Set Architectures

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Exemplary Instruction Formats

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

Figure 12:
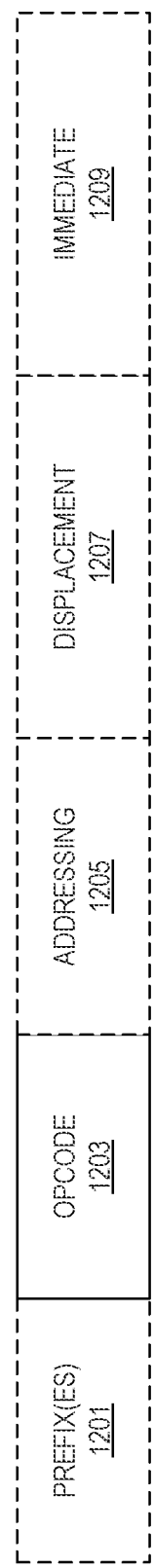
FIG. 12 illustrates examples of an instruction format.

FIG. 12 illustrates examples of an instruction format. As illustrated, an instruction may include multiple components including, but not limited to, one or more fields for: one or more prefixes 1201, an opcode 1203, addressing information 1205 (e.g., register identifiers, memory addressing information, etc.), a displacement value 1207, and/or an immediate value 1209. Note that some instructions utilize some or all of the fields of the format whereas others may only use the field for the opcode 1203. In some examples, the order illustrated is the order in which these fields are to be encoded, however, it should be appreciated that in other examples these fields may be encoded in a different order, combined, etc.

The prefix(es) field(s) 1201, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1203 is used to at least partially define the operation to be performed upon a decoding of the instruction. In some examples, a primary opcode encoded in the opcode field 1203 is one, two, or three bytes in length. In other examples, a primary opcode can be a different length. An additional 3-bit opcode field is sometimes encoded in another field.

The addressing field 1205 is used to address one or more operands of the instruction, such as a location in memory or one or more registers. FIG. 13 illustrates examples of the addressing field 1205. In this illustration, an optional ModR/M byte 1302 and an optional Scale, Index, Base (SIB) byte 1304 are shown. The ModR/M byte 1302 and the SIB byte 1304 are used to encode up to two operands of an instruction, each of which is a direct register or effective memory address. Note that each of these fields are optional in that not all instructions include one or more of these fields. The MOD R/M byte 1302 includes a MOD field 1342, a register (reg) field 1344, and R/M field 1346.

The content of the MOD field 1342 distinguishes between memory access and non-memory access modes. In some examples, when the MOD field 1342 has a binary value of 11 (11b), a register-direct addressing mode is utilized, and otherwise register-indirect addressing is used.

The register field 1344 may encode either the destination register operand or a source register operand, or may encode an opcode extension and not be used to encode any instruction operand. The content of register index field 1344, directly or through address generation, specifies the locations of a source or destination operand (either in a register or in memory). In some examples, the register field 1344 is supplemented with an additional bit from a prefix (e.g., prefix 1201) to allow for greater addressing.

The R/M field 1346 may be used to encode an instruction operand that references a memory address or may be used to encode either the destination register operand or a source register operand. Note the R/M field 1346 may be combined with the MOD field 1342 to dictate an addressing mode in some examples.

The SIB byte 1304 includes a scale field 1352, an index field 1354, and a base field 1356 to be used in the generation of an address. The scale field 1352 indicates scaling factor. The index field 1354 specifies an index register to use. In some examples, the index field 1354 is supplemented with an additional bit from a prefix (e.g., prefix 1201) to allow for greater addressing. The base field 1356 specifies a base register to use. In some examples, the base field 1356 is supplemented with an additional bit from a prefix (e.g., prefix 1201) to allow for greater addressing. In practice, the content of the scale field 1352 allows for the scaling of the content of the index field 1354 for memory address generation (e.g., for address generation that uses $2^{scale}*\text{index}+\text{base}$).

Some addressing forms utilize a displacement value to generate a memory address. For example, a memory address may be generated according to $2^{scale}*\text{index}+\text{base}+\text{displacement}$, index*scale+displacement, r/m+displacement, instruction pointer (RIP/EIP)+displacement, register+displacement, etc. The displacement may be a 1-byte, 2-byte, 4-byte, etc. value. In some examples, a displacement 1207 provides this value. Additionally, in some examples, a displacement factor usage is encoded in the MOD field of the addressing field 1205 that indicates a compressed displacement scheme for which a displacement value is calculated and stored in the displacement field 1207.

In some examples, an immediate field 1209 specifies an immediate value for the instruction. An immediate value may be encoded as a 1-byte value, a 2-byte value, a 4-byte value, etc.

Figure 14:
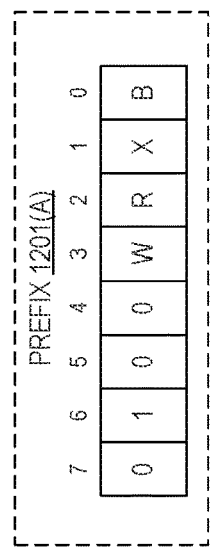
FIG. 14 illustrates examples of a first prefix.

FIG. 14 illustrates examples of a first prefix 1201(A). In some examples, the first prefix 1201(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1201(A) may specify up to three registers using 3-bit fields depending on the format: 1) using the reg field 1344 and the R/M field 1346 of the Mod R/M byte 1302; 2) using the Mod R/M byte 1302 with the SIB byte 1304 including using the reg field 1344 and the base field 1356 and index field 1354; or 3) using the register field of an opcode.

In the first prefix 1201(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1344 and MOD R/M R/M field 1346 alone can each only address 8 registers.

In the first prefix 1201(A), bit position 2 (R) may be an extension of the MOD R/M reg field 1344 and may be used to modify the ModR/M reg field 1344 when that field encodes a general-purpose register, a 64-bit packed data register (e.g., a SSE register), or a control or debug register. R is ignored when Mod R/M byte 1302 specifies other registers or defines an extended opcode.

Bit position 1 (X) may modify the SIB byte index field 1354.

Bit position 0 (B) may modify the base in the Mod R/M R/M field 1346 or the SIB byte base field 1356; or it may modify the opcode register field used for accessing general purpose registers (e.g., general purpose registers 1125).

Figure 15A:
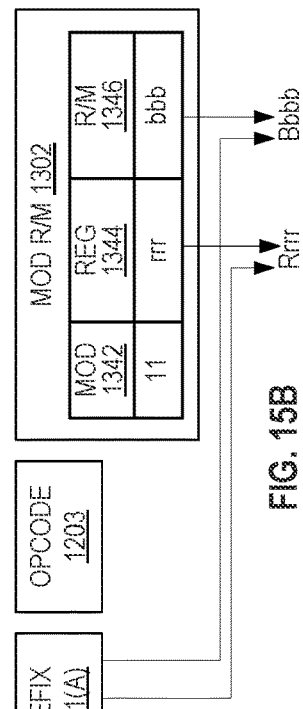
FIGS. 15A-D illustrate examples of how the R, X, and B fields of the first prefix in FIG. 14 are used.
Figure 15B:
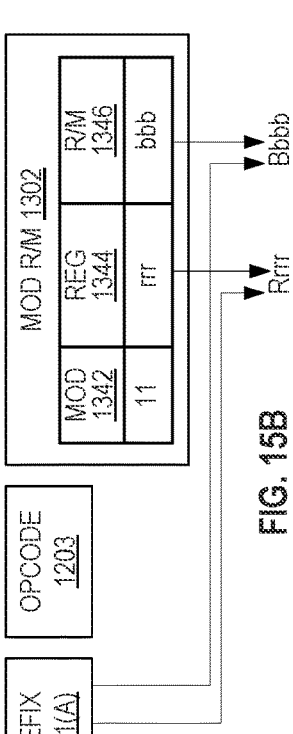
Figure 15C:
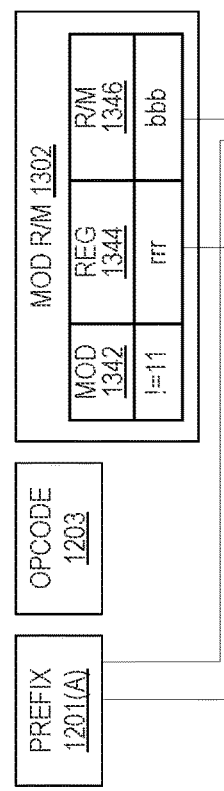
Figure 15D:
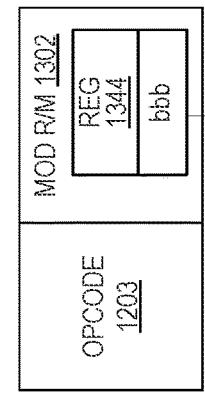

FIGS. 15A-D illustrate examples of how the R, X, and B fields of the first prefix 1201(A) are used. FIG. 15A illustrates R and B from the first prefix 1201(A) being used to extend the reg field 1344 and R/M field 1346 of the MOD R/M byte 1302 when the SIB byte 13 04 is not used for memory addressing. FIG. 15B illustrates R and B from the first prefix 1201(A) being used to extend the reg field 1344 and R/M field 1346 of the MOD R/M byte 1302 when the SIB byte 13 04 is not used (register-register addressing). FIG. 15C illustrates R, X, and B from the first prefix 1201(A) being used to extend the reg field 1344 of the MOD R/M byte 1302 and the index field 1354 and base field 1356 when the SIB byte 13 04 being used for memory addressing. FIG. 15D illustrates B from the first prefix 1201(A) being used to extend the reg field 1344 of the MOD R/M byte 1302 when a register is encoded in the opcode 1203.

FIGS. 16A-B illustrate examples of a second prefix 1201(B). In some examples, the second prefix 1201(B) is an example of a VEX prefix. The second prefix 1201(B) encoding allows instructions to have more than two operands, and allows SIMD vector registers (e.g., vector/SIMD registers 1110) to be longer than 64-bits (e.g., 128-bit and 256-bit). The use of the second prefix 1201(B) provides for three-operand (or more) syntax. For example, previous two-operand instructions performed operations such as A=A+B, which overwrites a source operand. The use of the second prefix 1201(B) enables operands to perform nondestructive operations such as A=B+C.

In some examples, the second prefix 1201(B) comes in two forms—a two-byte form and a three-byte form. The two-byte second prefix 1201(B) is used mainly for 128-bit, scalar, and some 256-bit instructions; while the three-byte second prefix 1201(B) provides a compact replacement of the first prefix 1201(A) and 3-byte opcode instructions.

FIG. 16A illustrates examples of a two-byte form of the second prefix 1201(B). In one example, a format field 1601 (byte 0 1603) contains the value C5H. In one example, byte 1 1605 includes a "R" value in bit[7]. This value is the complement of the "R" value of the first prefix 1201(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1 s complement) form and valid for instructions with 2 or more source operands; 2) encode the destination register operand, specified in is complement form for certain vector shifts; or 3) not encode any operand, the field is reserved and should contain a certain value, such as 1111b.

Instructions that use this prefix may use the Mod R/M R/M field 1346 to encode the instruction operand that references a memory address or encode either the destination register operand or a source register operand.

Instructions that use this prefix may use the Mod R/M reg field 1344 to encode either the destination register operand or a source register operand, be treated as an opcode extension and not used to encode any instruction operand.

For instruction syntax that support four operands, vvvv, the Mod R/M R/M field 1346 and the Mod R/M reg field 1344 encode three of the four operands. Bits[7:4] of the immediate 1209 are then used to encode the third source register operand.

FIG. 16B illustrates examples of a three-byte form of the second prefix 1201(B). In one example, a format field 1611 (byte 0 1613) contains the value C4H. Byte 1 1615 includes in bits[7:5] "R," "X," and "B" which are the complements of the same values of the first prefix 1201(A). Bits[4:0] of byte 1 1615 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1617 is used similar to W of the first prefix 1201(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1 s complement) form and valid for instructions with 2 or more source operands; 2) encode the destination register operand, specified in 1 s complement form for certain vector shifts; or 3) not encode any operand, the field is reserved and should contain a certain value, such as 1111b.

Instructions that use this prefix may use the Mod R/M R/M field 1346 to encode the instruction operand that references a memory address or encode either the destination register operand or a source register operand.

Instructions that use this prefix may use the Mod R/M reg field 1344 to encode either the destination register operand or a source register operand, be treated as an opcode extension and not used to encode any instruction operand.

For instruction syntax that support four operands, vvvv, the Mod R/M R/M field 1346, and the Mod R/M reg field 1344 encode three of the four operands. Bits[7:4] of the immediate 1209 are then used to encode the third source register operand.

FIG. 17 illustrates examples of a third prefix 1201(C). In some examples, the first prefix 1201(A) is an example of an EVEX prefix. The third prefix 1201(C) is a four-byte prefix.

The third prefix 1201(C) can encode 32 vector registers (e.g., 128-bit, 256-bit, and 512-bit registers) in 64-bit mode. In some examples, instructions that utilize a writemask/ opmask (see discussion of registers in a previous figure, such as FIG. 11) or predication utilize this prefix. Opmask register allow for conditional processing or selection control. Opmask instructions, whose source/destination operands are opmask registers and treat the content of an opmask register as a single value, are encoded using the second prefix 1201(B).

The third prefix 1201(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1201(C) is a format field 1711 that has a value, in one example, of 62H. Subsequent bytes are referred to as payload bytes 1715-1719 and collectively form a 24-bit value of P[23:0] providing specific capability in the form of one or more fields (detailed herein).

In some examples, P[1:0] of payload byte 1719 are identical to the low two mmmmm bits. P[3:2] are reserved in some examples. Bit P[4] (R') allows access to the high 16 vector register set when combined with P[7] and the ModR/M reg field 1344. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1344 and ModR/M R/M field 1346. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1 s complement) form and valid for instructions with 2 or more source operands; 2) encode the destination register operand, specified in is complement form for certain vector shifts; or 3) not encode any operand, the field is reserved and should contain a certain value, such as 1111b.

P[15] is similar to W of the first prefix 1201(A) and second prefix 1211(B) and may serve as an opcode extension bit or operand size promotion.

P[18:16] specify the index of a register in the opmask (writemask) registers (e.g., writemask/predicate registers 1115). In one example, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22: 21]). P[23] indicates support for merging-writemasking (e.g., when set to 0) or support for zeroing and merging-writemasking (e.g., when set to 1).

Exemplary examples of encoding of registers in instructions using the third prefix 1201(C) are detailed in the following tables.

TABLE 11

32-Register Support in 64-bit Mode

| | 4 | 3 | [2:0] | REG. TYPE | COMMON USAGES |
|---|---|---|---|---|---|
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 12

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 13

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-k7 | $1^{st}$ Source |
| {k1} | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, Etc.)

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 18 illustrates a block diagram contrasting the use of a software instruction converter to convert binary instructions in a source instruction set architecture to binary instructions in a target instruction set architecture according to examples. In the illustrated example, the instruction converter is a software instruction converter, although alternatively the instruction converter may be implemented in software, firmware, hardware, or various combinations thereof. FIG. 18 shows a program in a high-level language 1802 may be compiled using a first ISA compiler 1804 to generate first ISA binary code 1806 that may be natively executed by a processor with at least one first instruction set architecture core 1816. The processor with at least one first ISA instruction set architecture core 1816 represents any processor that can perform substantially the same functions as an Intel® processor with at least one first ISA instruction set architecture core by compatibly executing or otherwise processing (1) a substantial portion of the instruction set architecture of the first ISA instruction set architecture core or (2) object code versions of applications or other software targeted to run on an Intel processor with at least one first ISA instruction set architecture core, in order to achieve substantially the same result as a processor with at least one first ISA instruction set architecture core. The first ISA compiler 1804 represents a compiler that is operable to generate first ISA binary code 1806 (e.g., object code) that can, with or without additional linkage processing, be executed on the processor with at least one first ISA instruction set architecture core 1816. Similarly, FIG. 18 shows the program in the high-level language 1802 may be compiled using an alternative instruction set architecture compiler 1808 to generate alternative instruction set architecture binary code 1810 that may be natively executed by a processor without a first ISA instruction set architecture core 1814. The instruction converter 1812 is used to convert the first ISA binary code 1806 into code that may be natively executed by the processor without a first ISA instruction set architecture core 1814. This converted code is not necessarily to be the same as the alternative instruction set architecture binary code 1810; however, the converted code will accomplish the general operation and be made up of instructions from the alternative instruction set architecture. Thus, the instruction converter 1812 represents software, firmware, hardware, or a combination thereof that, through emulation, simulation or any other process, allows a processor or other electronic device that does not have a first ISA instruction set architecture processor or core to execute the first ISA binary code 1806.

Techniques and architectures for instructions for min-max operations are described herein. In the above description, for purposes of explanation, numerous specific details are set forth in order to provide a thorough understanding of certain examples. It will be apparent, however, to one skilled in the art that certain examples can be practiced without these specific details. In other instances, structures and devices are shown in block diagram form in order to avoid obscuring the description Additional Notes and Examples Example 1 includes an apparatus comprising decoder circuitry to decode a single instruction, the single instruction to include a field for an identifier of a first source operand, a field for an identifier of a second source operand, a field for an identifier of a destination operand, a field for an immediate operand, and a field for an opcode, the opcode to indicate execution circuitry is to perform a min-max operation, and execution circuitry to execute the decoded instruction according to the opcode to perform the min-max operation to determine a particular operation of five or more minimum and maximum operations in accordance with a value of the immediate operand, perform the determined particular operation on the identified first source operand and the identified second source operand to return a result, and store the result into the identified destination operand.

Example 2 includes the apparatus of Example 1, wherein the field for the identifier of the first source operand is to identify a vector register.

Example 3 includes the apparatus of Example 1, wherein the field for the identifier of the first source operand is to identify a memory location.

Example 4 includes the apparatus of any of Examples 1 to 3, wherein the value of the immediate operand indicates one of a minimum operation and a maximum operation, and wherein the execution circuitry is further to execute the decoded instruction according to the opcode to return a symbolic floating-point datum as the result if any of the identified first source operand and the identified second source operand is a symbolic floating-point datum.

Example 5 includes the apparatus of Example 4, wherein the execution circuitry is further to execute the decoded instruction according to the opcode to return a quiet Not-a-Number (NAN) as the result if either of the identified first and second source operands is a NAN.

Example 6 includes the apparatus of any of Examples 1 to 5, wherein the value of the immediate operand indicates one of a minimum number operation and a maximum number operation, and wherein the execution circuitry is further to execute the decoded instruction according to the opcode to return the identified first source operand as the result if the identified first source operand is a number and the identified second source operand is any type of symbolic floating-point datum, and return the identified second source operand as the result if the identified second source operand is a number and the identified first source operand is any type of symbolic floating-point datum.

Example 7 includes the apparatus of Example 6, wherein the execution circuitry is further to execute the decoded instruction according to the opcode to return the identified first source operand as the result if the identified first source operand is a number and the identified second source operand is a signaling Not-a-Number (NAN), and return the identified second source operand as the result if the identified second source operand is a number and the identified first source operand is a signaling NAN.

Example 8 includes a method, comprising fetching an instruction having fields for an opcode, a destination operand, first and second source operands, and an immediate operand, decoding the instruction according to the opcode, retrieving data associated with the first and second source operands, scheduling execution of the instruction, and executing the decoded instruction to determine a particular operation of five or more minimum and maximum operations in accordance with a value of the immediate operand, perform the determined particular operation on the first source operand and the second source operand to return a result, and store the result into the destination operand.

Example 9 includes the method of Example 8, wherein the value of the immediate operand indicates one of a minimum operation and a maximum operation, further comprising executing the decoded instruction to return a symbolic floating-point datum as the result if any of the first source operand and the second source operand is a symbolic floating-point datum.

Example 10 includes the method of Example 9, further comprising executing the decoded instruction to return a quiet Not-a-Number (NAN) as the result if either of the first and second source operands is a NAN.

Example 11 includes the method of any of Examples 8 to 10, wherein the value of the immediate operand indicates one of a minimum number operation and a maximum number operation, further comprising executing the decoded instruction to return the first source operand as the result if the first source operand is a number and the second source operand is any type of symbolic floating-point datum, and return the second source operand as the result if the second source operand is a number and the first source operand is any type of symbolic floating-point datum.

Example 12 includes the method of Example 11, further comprising executing the decoded instruction to return the first source operand as the result if the first source operand is a number and the second source operand is a signaling Not-a-Number (NAN), and return the second source operand as the result if the second source operand is a number and the first source operand is a signaling NAN.

Example 13 includes the method of any of Examples 8 to 12, wherein the value of the immediate operand indicates one of a minimum magnitude operation and a maximum magnitude operation, further comprising executing the decoded instruction to return a symbolic floating-point datum as the result if any of the first source operand and the second source operand is a symbolic floating-point datum.

Example 14 includes the method of Example 13, further comprising executing the decoded instruction to return a quiet Not-a-Number (NAN) as the result if either of the first and second source operands is a NAN.

Example 15 includes an apparatus, comprising a processor coupled to the memory to perform floating point arithmetic operations that include at least minimum operations, maximum operations, and magnitude operations, and circuitry coupled to the processor and the memory to, in response to a single processor instruction, cause the processor to perform a particular operation of five or more min-max operations on two or more source inputs to produce one or more results.

Example 16 includes the apparatus of Example 15, wherein, in response to the single processor instruction, the circuitry is further to cause the processor to store the one or more results of the particular operation in a location indicated by the single processor instruction.

Example 17 includes the apparatus of any of Examples 15 to 16, wherein the single processor instruction includes an immediate operand that indicates the particular operation of the five or more min-max operations.

Example 18 includes the apparatus of Example 17, wherein the immediate operand indicates the particular operation as one of a minimum operation, a minimum number operation, a minimum magnitude operation, a minimum magnitude number operation, a maximum operation, a maximum number operation, a maximum magnitude operation, and a maximum magnitude number operation.

Example 19 includes the apparatus of any of Examples 15 to 18, wherein, in response to the single processor instruction, the circuitry is further to cause the processor to determine that the particular operation is one of a minimum operation and a maximum operation, and perform the particular operation to return a quiet Not-a-Number (NAN) as a result if either of the two or more source inputs for the particular operation is a NAN.

Example 20 includes the apparatus of any of Examples 15 to 19, wherein, in response to the single processor instruction, the circuitry is further to cause the processor to determine that the particular operation is one of a minimum number operation and a maximum number operation, and perform the particular operation to return a first source input of the two or more source inputs as the result if the first source input for the particular operation is a number and a second source input of the two or more source inputs for the particular operation is a signaling Not-a-Number (NAN), and return a second source input of the two or more source inputs as the result if the second source input for the particular operation is a number and a first source input of the two or more source inputs for the particular operation is a signaling NAN.

Example 21 includes the apparatus of any of Examples 15 to 20, wherein, in response to the single processor instruction, the circuitry is further to cause the processor to determine that the particular operation is one of a minimum magnitude operation and a maximum magnitude operation, and perform the particular operation to return a quiet Not-a-Number (NAN) as the result if either of the two or more source inputs for the particular operation is a NAN.

Example 22 includes an apparatus, comprising means for fetching an instruction having fields for an opcode, a destination operand, first and second source operands, and an immediate operand, means for decoding the instruction according to the opcode, means for retrieving data associated with the first and second source operands, means for scheduling execution of the instruction, and means for executing the decoded instruction to determine a particular operation of five or more minimum and maximum operations in accordance with a value of the immediate operand, perform the determined particular operation on the first source operand and the second source operand to return a result, and store the result into the destination operand.

Example 23 includes the apparatus of Example 22, wherein the value of the immediate operand indicates one of a minimum operation and a maximum operation, further comprising means for executing the decoded instruction to return a symbolic floating-point datum as the result if any of the first source operand and the second source operand is a symbolic floating-point datum.

Example 24 includes the apparatus of Example 23, further comprising means for executing the decoded instruction to return a quiet Not-a-Number (NAN) as the result if either of the first and second source operands is a NAN.

Example 25 includes the apparatus of any of Examples 22 to 24, wherein the value of the immediate operand indicates one of a minimum number operation and a maximum number operation, further comprising means for executing the decoded instruction to return the first source operand as the result if the first source operand is a number and the second source operand is any type of symbolic floating-point datum, and return the second source operand as the result if the second source operand is a number and the first source operand is any type of symbolic floating-point datum.

Example 26 includes the apparatus of Example 25, further comprising means for executing the decoded instruction to return the first source operand as the result if the first source operand is a number and the second source operand is a signaling Not-a-Number (NAN), and return the second source operand as the result if the second source operand is a number and the first source operand is a signaling NAN.

Example 27 includes the apparatus of any of Examples 22 to 26, wherein the value of the immediate operand indicates one of a minimum magnitude operation and a maximum magnitude operation, further comprising means for executing the decoded instruction to return a symbolic floating-point datum as the result if any of the first source operand and the second source operand is a symbolic floating-point datum.

Example 28 includes the apparatus of Example 27, further comprising means for executing the decoded instruction to return a quiet Not-a-Number (NAN) as the result if either of the first and second source operands is a NAN.

Example 29 includes at least one non-transitory one machine readable medium comprising a plurality of instructions that, in response to being executed on a computing device, cause the computing device to fetch an instruction having fields for an opcode, a destination operand, first and second source operands, and an immediate operand, decode the instruction according to the opcode, retrieve data associated with the first and second source operands, schedule execution of the instruction, and execute the decoded instruction to determine a particular operation of five or more minimum and maximum operations in accordance with a value of the immediate operand, perform the determined particular operation on the first source operand and the second source operand to return a result, and store the result into the destination operand.

Example 30 includes the at least one non-transitory one machine readable medium of Example 29, wherein the value of the immediate operand indicates one of a minimum operation and a maximum operation comprising a plurality of further instructions that, in response to being executed on the computing device, cause the computing device to execute the decoded instruction to return a symbolic floating-point datum as the result if any of the first source operand and the second source operand is a symbolic floating-point datum.

Example 31 includes the at least one non-transitory one machine readable medium of Example 30, comprising a plurality of further instructions that, in response to being executed on the computing device, cause the computing device to execute the decoded instruction to return a quiet Not-a-Number (NAN) as the result if either of the first and second source operands is a NAN.

Example 32 includes the at least one non-transitory one machine readable medium of any of Examples 29 to 31, wherein the value of the immediate operand indicates one of a minimum number operation and a maximum number operation, comprising a plurality of further instructions that, in response to being executed on the computing device, cause the computing device to execute the decoded instruction to return the first source operand as the result if the first source operand is a number and the second source operand is any type of symbolic floating-point datum, and return the second source operand as the result if the second source operand is a number and the first source operand is any type of symbolic floating-point datum.

Example 33 includes the at least one non-transitory one machine readable medium of Example 31, comprising a plurality of further instructions that, in response to being executed on the computing device, cause the computing device to execute the decoded instruction to return the first source operand as the result if the first source operand is a number and the second source operand is a signaling Not-a-Number (NAN), and return the second source operand as the result if the second source operand is a number and the first source operand is a signaling NAN.

Example 34 includes the at least one non-transitory one machine readable medium of any of Examples 29 to 33, wherein the value of the immediate operand indicates one of a minimum magnitude operation and a maximum magnitude operation, comprising a plurality of further instructions that, in response to being executed on the computing device, cause the computing device to execute the decoded instruction to return a symbolic floating-point datum as the result if any of the first source operand and the second source operand is a symbolic floating-point datum.

Example 35 includes the at least one non-transitory one machine readable medium of Example 34, comprising a plurality of further instructions that, in response to being executed on the computing device, cause the computing device to execute the decoded instruction to return a quiet Not-a-Number (NAN) as the result if either of the first and second source operands is a NAN.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain examples also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain examples are not described with reference to any particular programming language. It will be appreciated that a variety of programming languages may be used to implement the teachings of such examples as described herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
   decoder circuitry to decode a single instruction, wherein the single instruction is to comprise:
   respective identifiers of a first source operand, a second source operand, and a destination operand;
   an immediate operand which is to identify any of a plurality of operations comprising multiple minimum operations and multiple maximum operations; and
   an opcode which is to indicate that a selected operation of the plurality of operations is to be performed; and
   execution circuitry to execute the decoded instruction according to the opcode, comprising the execution circuitry to:
   identify, based on a value of the immediate operand, a selection of a first operation from among the plurality of operations;
   perform the first operation based on the first source operand and the second source operand to return a result; and
   store the result into the destination operand;
   wherein:
   the execution circuity to perform one of the plurality of operations comprises:
   where one of the first source operand or the second source operand is a number, and the other of the first source operand or the second source operand is a respective symbolic floating-point datum, the execution circuitry to return the one of the first source operand or the second source operand as the result; and
   the execution circuity to perform another of the plurality of operations comprises:
   where either of the first source operand or the second source operand is a respective symbolic floating-point datum, the execution circuitry to return a symbolic floating-point datum as the result.

2. The apparatus of claim 1, wherein the identifier of the first source operand is to identify a vector register.

3. The apparatus of claim 1, wherein the immediate operand is to comprise:
   a first bit to indicate either of a minimum operation type or a maximum operation type;
   a second bit to indicate whether, where the one of the first source operand or the second source operand is the number, and the other of the first source operand or the second source operand is the respective symbolic floating-point datum, the result is to be of a symbolic floating-point datum type; and
   a third bit to indicate whether the selected operation is to comprise a comparison of respective magnitudes of the first source operand and the second source operand.

4. The apparatus of claim 1, wherein:
   the execution circuitry to perform the one of the plurality of operations comprises:
   where each of the first source operand and the second source operand is a respective number, the execution circuitry is to return a minimum of the first source operand and the second source operand; and
   the execution circuitry to perform the other of the plurality of operations comprises:
   where each of the first source operand and the second source operand is a respective number, the execution circuitry is to return a maximum of the first source operand and the second source operand.

5. The apparatus of claim 1, wherein the execution circuitry to perform the other of the plurality of operations comprises:
   where either of the source operand or the second source operand is a respective not-a-number (NAN) datum, the execution circuitry to return a quiet NAN datum as the result.

6. The apparatus of claim 1, wherein the execution circuitry to perform the first operation comprises:
   where each of the first source operand and the second source operand is a respective number, the execution circuitry to perform a comparison of respective magnitudes of the first source operand and the second source operand.

7. The apparatus of claim 6, wherein the execution circuitry to perform the first operation further comprises:
   where either of the first source operand or the second source operand is a respective symbolic floating-point datum, the execution circuitry is to return a symbolic floating-point datum as the result.

8. A method, comprising:
   fetching an instruction comprising:
   respective identifiers of a first source operand, a second source operand, and a destination operand;
   an immediate operand which is to identify any of a plurality of operations comprising multiple minimum operations and multiple maximum operations; and
   an opcode which indicates that a selected operation of the plurality of operations is to be performed; and
   decoding the instruction according to the opcode;
   retrieving data associated with the first and second source operands;
   scheduling execution of the instruction; and
   executing the decoded instruction, comprising:
   identifying, based on a value of the immediate operand, a selection of a first operation from among the plurality of operations;
   performing the first operation based on the first source operand and the second source operand to return a result; and
   storing the result into the destination operand;
   wherein:
   performing one of the plurality of operations is to comprise:
   where one of the first source operand or the second source operand is a number, and the other of the first source operand or the second source operand is a respective symbolic floating-point datum, returning the one of the first source operand or the second source operand as the result; and
   performing another of the plurality of operations is to comprise:

where either of the first source operand or the second source operand is a respective symbolic floating-point datum, returning a symbolic floating-point datum as the result.

9. The method of claim 8, wherein:
performing the one of the plurality of operations comprises:
where each of the first source operand and the second source operand is a respective number, returning a minimum of the first source operand and the second source operand; and
performing the other of the plurality of operations comprises:
where each of the first source operand and the second source operand is a respective number, returning a maximum of the first source operand and the second source operand.

10. The method of claim 8, wherein performing the other of the plurality of operations comprises:
where either of the first source operand or the second source operand is a respective not-a-number (NAN) datum, returning a quiet NAN datum as the result.

11. The method of claim 8, wherein performing the first operation comprises:
where each of the first source operand and the second source operand is a respective number, performing a comparison of respective magnitudes of the first source operand and the second source operand.

12. The method of claim 11, wherein performing the first operation further comprises:
where either of the first source operand or the second source operand is a respective symbolic floating-point datum, returning a symbolic floating-point datum as the result.

13. The method of claim 8, wherein the immediate operand comprises:
a first bit which indicates either of a minimum operation type or a maximum operation type;
a second bit which indicates whether, where the one of the first source operand or the second source operand is the number, and the other of the first source operand or the second source operand is the respective symbolic floating-point datum, the result is to be of a symbolic floating-point datum type; and
a third bit which indicates whether the selected operation is to comprise a comparison of respective magnitudes of the first source operand and the second source operand.

14. An apparatus, comprising:
a memory;
a processor coupled to the memory, the processor comprising:
first circuitry to fetch from the memory a single instruction which is to comprise:
respective identifiers of a first source operand, a second source operand, and a destination operand;
an immediate operand which is to identify any of a plurality of operations comprising multiple minimum operations, and multiple maximum operations; and
an opcode which is to indicate that a selected operation of the plurality of operations it to be performed;
second circuitry coupled to the first circuitry, the second circuitry to decode the single instruction to generate a decoded instruction; and
third circuitry to execute the decoded instruction according to the opcode, comprising the third circuitry to:
identify, based on a value of the immediate operand, a selection of a first operation from among the plurality of operations;
perform the first operation based on the first source operand and the second source operand to return a result; and
store the result into the destination operand;
wherein:
the third circuitry to perform one of the plurality of operations comprises:
where one of the first source operand or the second source operand is a number, and the other of the first source operand or the second source operand is a respective symbolic floating-point datum, the third circuitry to return the one of the first source operand or the second source operand as the result; and
the third circuitry to perform another of the plurality of operations comprises:
where either of the first source operand or the second source operand is a respective symbolic floating-point datum, the third circuitry to return a symbolic floating-point datum as the result.

15. The apparatus of claim 14, wherein the immediate operand is to comprise:
a first bit to indicate either of a minimum operation type or a maximum operation type;
a second bit to indicate whether, where the one of the first source operand or the second source operand is the number, and the other of the first source operand or the second source operand is the respective symbolic floating-point datum, the result is to be of a symbolic floating-point datum type; and
a third bit to indicate whether the selected operation is to comprise a comparison of respective magnitudes of the first source operand and the second source operand.

16. The apparatus of claim 14, wherein the third circuitry to perform the other of the plurality of operations comprises:
where either of the first source operand or the second source operand is a respective Not-a-Number (NAN) datum, the third circuitry to return a quiet NAN datum as the result.

17. The apparatus of claim 14, wherein the third circuitry to perform the first operation comprises:
where each of the first source operand and the second source operand is a respective number, the third circuitry to perform a comparison of respective magnitudes of the first source operand and the second source operand.

18. The apparatus of claim 14, wherein data for the first source operand and the second source operand comprises one or more of half-precision floating point data represented with 16 bits, single-precision floating point data represented with 32 bits, double-precision floating point data represented with 64 bits, or brain floating point data represented with 16 bits.

* * * * *